(12) United States Patent
Kang et al.

(10) Patent No.: US 10,470,211 B2
(45) Date of Patent: Nov. 5, 2019

(54) APPARATUS AND METHOD FOR BAND SHARING IN WIRELESS COMMUNICATION SYSTEM

(71) Applicants: Samsung Electronics Co., Ltd., Suwon-si, Gyeonggi-do (KR); KOREA UNIVERSITY RESEARCH AND BUSINESS FOUNDATION, Seoul (KR)

(72) Inventors: Chung Gu Kang, Seoul (KR); Chung Kee Kim, Seoul (KR); Chan Seok Yang, Yongin-si (KR)

(73) Assignees: Samsung Electronics Co., Ltd., Suwon-si (KR); Korea University Research and Business Foundation, Seoul (KR)

(*) Notice: Subject to any disclaimer, the term of this patent is extended or adjusted under 35 U.S.C. 154(b) by 0 days.

(21) Appl. No.: 15/566,619

(22) PCT Filed: Apr. 12, 2016

(86) PCT No.: PCT/KR2016/003846
§ 371 (c)(1),
(2) Date: Oct. 13, 2017

(87) PCT Pub. No.: WO2016/167546
PCT Pub. Date: Oct. 20, 2016

(65) Prior Publication Data
US 2018/0139780 A1    May 17, 2018

(30) Foreign Application Priority Data
Apr. 14, 2015    (KR) .................. 10-2015-0052508

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC .. H04W 74/0808; H04W 72/08; H04W 72/04
See application file for complete search history.

(56) References Cited

U.S. PATENT DOCUMENTS

2013/0208587 A1   8/2013   Bala et al.
2014/0029585 A1   1/2014   Freda et al.
(Continued)

FOREIGN PATENT DOCUMENTS

KR   10-2014-0125408 A   10/2014

OTHER PUBLICATIONS

3GPP TS 36.213 V13.6.0 (Jun. 2017), 3rd Generation Partnership Project; Technical Specification Group Radio Access Network; Evolved Universal Terrestrial Radio Access (E-UTRA); Physical layer procedures (Release 13), 389 pages.
(Continued)

*Primary Examiner* — Dady Chery

(57) ABSTRACT

The present disclosure relates to a pre-5th-generation (5G) or 5G communication system to be provided for supporting higher data rates beyond 4th-generation (4G) communication system such as long term evolution (LTE). An apparatus of a base station in a wireless communication system is provided. The apparatus includes at least one processor configured to determine a length of a channel occupancy period and a length of a contention period with respect to a band shared with other system, and a transceiver configured to, when detecting no signal of the other system until a time indicated by a back-off value in the contention period, transmit a signal over the band. A method of a base station in a wireless communication system is provided. The method includes determining a length of a channel occu-
(Continued)

pancy period and a length of a contention period with respect to a band shared with other system, and when detecting no signal of the other system until a time indicated by a back-off value in the contention period, transmitting a signal over the band.

18 Claims, 30 Drawing Sheets

(56) References Cited

U.S. PATENT DOCUMENTS

| | | | |
|---|---|---|---|
| 2014/0031054 A1 | 1/2014 | Zou et al. | |
| 2016/0057770 A1* | 2/2016 | Yerramalli | H04B 7/0811 370/329 |
| 2017/0048718 A1* | 2/2017 | Kim | H04W 56/0005 |
| 2017/0086225 A1* | 3/2017 | Ljung | H04W 74/0808 |
| 2018/0324860 A1* | 11/2018 | Mattsson | H04W 74/0816 |

OTHER PUBLICATIONS

Huawei, Hisilicon, "LBT schemes design for LAA," R1-151298, 3GPP TSG RAN WG1 Meeting #80bis, Belgrade, Serbia, Apr. 20-24, 2015, 3 pages.

IEEE Standards Association, IEEE Std. 802.Nov. 2012 (Revision of IEEE Std. 802.Nov. 2007), IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE Computer Society, IEEE, New York, NY Mar. 29, 2012, 2793 pages.

Samsung, "LAA performance analysis on FBE and LBE for reuse-1," R1-151628, 3GPP TSG RAN WG1 Meeting #80bis, Belgrade, Serbia, Apr. 20-24, 2015, 9 pages.

ZTE, "Discussion on LBT Design for LAA," R1-151809, 3GPP TSG RAN WG1 Meeting #80bis, Belgrade, Serbia, Apr. 20-24, 2015, 5 pages.

ISA/KR, "International Search Report," Application No. PCT/KR2016/003846, dated Jul. 13, 2016, Korean Intellectual Property Office, Korea, 3 pages.

ISA/KR, "Written Opinion of the International Searching Authority," Application No. PCT/KR2016/003846, dated Jul. 13, 2016, Korean Intellectual Property Office, Korea, 8 pages.

* cited by examiner

APPARATUS AND METHOD FOR BAND SHARING IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/003846 filed Apr. 12, 2016, which claims the benefit of Korean Patent Application No. 10-2015-0052508 filed Apr. 14, 2015, the disclosures of which are fully incorporated herein by reference into the present disclosure as if fully set forth herein.

TECHNICAL FIELD

The present disclosure relates to band sharing in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Also, 3rd Generation Partnership Project (3GPP) LTE is standardizing an LTE system using Licensed-Assisted Access (LAA). For doing so, when LTE-Unlicensed (LTE-U) and other system coexist, a channel control technique for sharing their band is required. For example, the other system can be a wireless Local Area Network (LAN). In other words, when the LTE-U system and the other system use the same frequency band, an adaptive channel control method is required to block either system from exclusively using the channel.

SUMMARY

According to various embodiments, an apparatus of a base station in a wireless communication system is provided. The apparatus includes at least one processor configured to determine a length of a channel occupancy period and a length of a contention period with respect to a band shared with other system and a transceiver configured to, when detecting no signal of the other system until a time indicated by a back-off value in the contention period, transmit a signal over the band.

According to various embodiments, a method for operating a base station in a wireless communication system is provided. The method includes determining a length of a channel occupancy period and a length of a contention period with respect to a band shared with other system and when detecting no signal of the other system until a time indicated by a back-off value in the contention period, transmitting a signal over the band.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
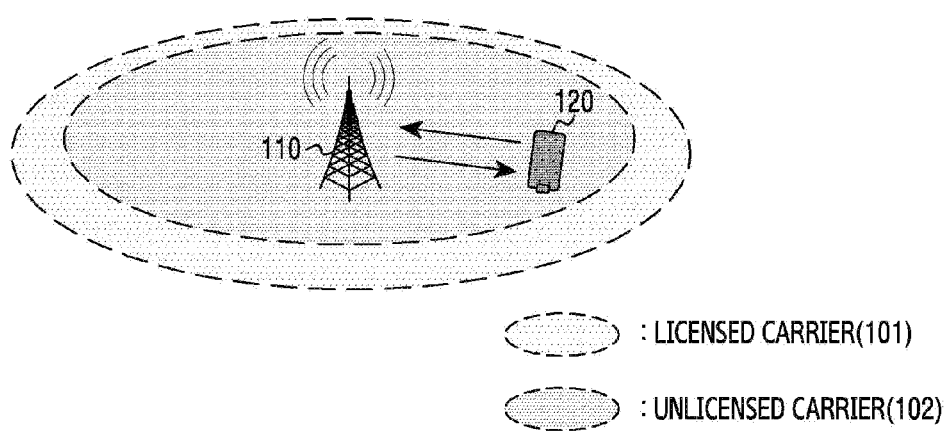
FIG. 1 illustrates an example of carrier use in a wireless communication system according to an embodiment of the present disclosure.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Accordingly, an embodiment of the present disclosure provide a method and an apparatus for sharing one band with other system in a wireless communication system.

An embodiments of the present disclosure provide a method and an apparatus for preventing performance degradation of an existing system according to band sharing in a wireless communication system.

An embodiments of the present disclosure provide a method and an apparatus for conducting adaptive channel control for band sharing with other system in a wireless communication system.

An embodiments of the present disclosure provide a method and an apparatus for adaptively controlling a channel occupancy period in a wireless communication system.

Another embodiments of the present disclosure provide a method and an apparatus for adaptively controlling a channel occupancy time based on a delay weighting factor in a wireless communication system.

Yet another embodiments of the present disclosure provide a method and an apparatus for adaptively controlling an unoccupnacy period in a wireless communication system.

Still another embodiments of the present disclosure provide a method and an apparatus for adaptively controlling an unoccupancy period based on an inter-channel interference report of a User Equipment (UE) in a wireless communication system.

A further embodiments of the present disclosure provide a method and an apparatus for adaptively controlling an unoccupancy period based on a preamble signal received from other system over a sharing band in a wireless communication systems.

A further embodiments of the present disclosure provide a method and an apparatus for adaptively controlling an unoccupancy period based on load of other system of a sharing band in a wireless communication system.

Hereinafter, an operational principle of the present disclosure is described in detail with reference to the accompanying drawings. In the following explanations, well-known functions or constitutions will not be described in detail if they would unnecessarily obscure the subject matter of the present disclosure. Also, terminologies to be described below are defined in consideration of functions in the present disclosure and can vary depending on a user's or an operator's intention or practice. Thus, their definitions should be defined based on all the contents of the specification.

Hereinafter, the present disclosure provides a technique for sharing a band with other system in a wireless communication system. Specifically, the present disclosure provides various embodiments for addressing inefficient channel use and a fairness problem between systems in the band sharing between heterogeneous systems.

Terms indicating variables (e.g., Channel Occupancy Time (COT), Idle Time (IT), etc.) for controlling an operating period, terms indicating control information, terms indicating network entities, terms indicating messages, and terms indicating components of an apparatus used in the following descriptions, are defined to ease the understanding. Accordingly, the present disclosure is not limited to those terms and can adopt other terms having technically equivalent meanings.

Also, to ease the understanding, the present disclosure use terms and names defined in 3rd Generation Partnership Project (3GPP) standard, but the present disclosure is not limited to those terms and names and can be equally applied to systems conforming to other standards.

FIG. 1 illustrates an example of carrier use in a wireless communication system according to an embodiment of the present disclosure.

Referring to FIG. 1, an evolved Node B (eNB) 110 and a User Equipment (UE) 120 can perform communication using a licensed carrier 101 and an unlicensed carrier 102. The licensed carrier 101 is a carrier which uses a frequency band licensed by the system, and the unlicensed carrier 102 is a carrier which uses a frequency band not licensed by the system. Herein, the unlicensed frequency band can be an Industrial Scientific and Medical (ISM) band. For example, the system according to an embodiment of the present disclosure can adopt Long Term Evolution-Unlicensed (LTE-U) technology.

The band used by the unlicensed carrier 102 can be shared by other system. For example, the other system can use an un-synchronized radio access scheme. Specifically, the other system can include a Wireless Fidelity (Wi-Fi) system. Hereafter, to ease the understanding, the system according to an embodiment of the present disclosure can be referred to as a first system, and the other system can be referred to as a second system.

Figure 2:
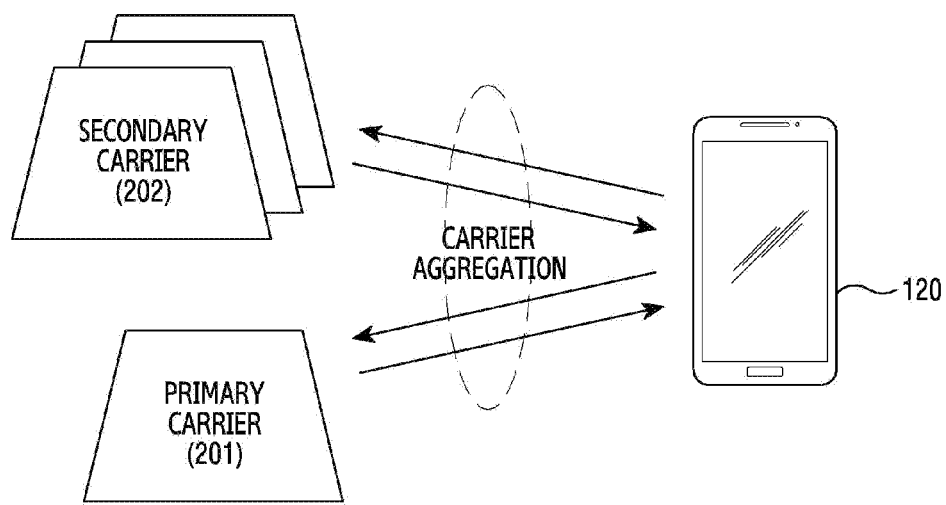
FIG. 2 illustrates an example of carrier aggregation in a wireless communication system according to an embodiment of the present disclosure.

FIG. 2 illustrates Carrier Aggregation (CA) in a wireless communication system according to an embodiment of the present disclosure. FIG. 2 illustrates utilization of the licensed carrier 101 and the unlicensed carrier 102 in the wireless communication system according to an embodiment of the present disclosure.

Referring to FIG. 2, the UE 120 can send and receive signals to and from the eNB 110 through a primary carrier 201, and send and receive signals through a secondary carrier 202. That is, the UE 120 can receive a greater communication capacity thanks to the CA using the secondary carrier 202 and the primary carrier 201. The CA provides a service using two frequencies, and indicates a technique which uses a plurality of carriers together for one UE. In some cases, the CA combining different radio access technologies can be performed. For example, the CA which combines LTE technologies, the LTE technology and a 3G technology, or the LTE technology and the Wi-Fi technology can be conducted. In FIG. 2, the primary carrier 201 can include the licensed carrier 101 of FIG. 1, and the secondary carrier 202 can include the unlicensed carrier of FIG. 1. In other words, the primary carrier 201 can occupy the licensed band, and the second carrier 202 can occupy the unlicensed band shared with the other system, that is, the second system. A cell built by the primary carrier 201 can be referred to as a primary (P)-cell, and a cell built by the secondary carrier 202 can be referred to as a Secondary (S) cell.

Figure 3A:
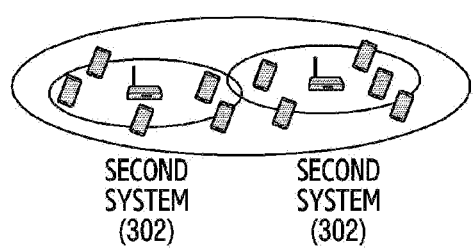
FIGS. 3A and 3B illustrate band sharing of a wireless communication system and other system according to an embodiment of the present disclosure.
Figure 3B:
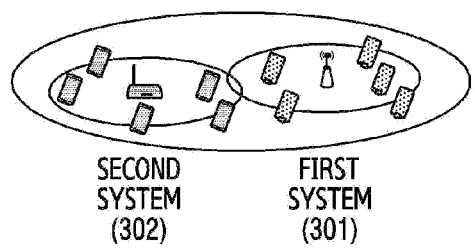

FIGS. 3A and 3B illustrate band sharing of a wireless communication system and other system according to an embodiment of the present disclosure. FIG. 3A illustrates a case where the second system 302 uses an unlicensed band, and FIG. 3B illustrates a case where the first system 301 and the second system 302 share the unlicensed band.

Referring to FIG. 3A, the second system 302 occupies the whole unlicensed band. In this case, control for avoiding collisions between devices of the second system 302 is performed. For example, a Carrier Sense Multiple Access (CSMA)/Collision Avoidance (CA) technology can be employed. The CSMA/CA technology can be used when a plurality of UEs is connected to and communicates with the same node.

Referring to FIG. 3B, the first system 301 and the second system 302 according to an embodiment of the present disclosure share the unlicensed band. Herein, the unlicensed band can be the ISM band. In other words, the first system 301 and the second system 302 coexist in the same band. Herein, the first system 301 can support synchronous access, and the second system 302 can support asynchronous access.

According to embodiments of the present disclosure, the first system 301 and the second system 302 can operate in a communication standard environment using the unlicensed carrier. For example, the communication standard can include the wireless LAN, the LTE-U, and so on. Also, messages between the first system 301 and the second system 302 may be or may not be analyzed. The band sharing between the first system 301 and the second system 302 can be based on a Listen Before Talk (LBT) scheme. According to an embodiment of the present disclosure, the second system 302, as an existing system in the unlicensed band, can be referred to as a primary system. The first system 301, as a new system entering the unlicensed band, can be referred to as a secondary system.

When the first system 301 and the second system 302 share the band, unfairness of a transmission opportunity can occur between the first system 301 and the second system 302. Hence, the present disclosure suggests various embodiments for giving the second system 302 the same or more transmission opportunities than before sharing the band with the first system 301, and concurrently giving an efficient transmission opportunity to the first system 301.

Figure 4:
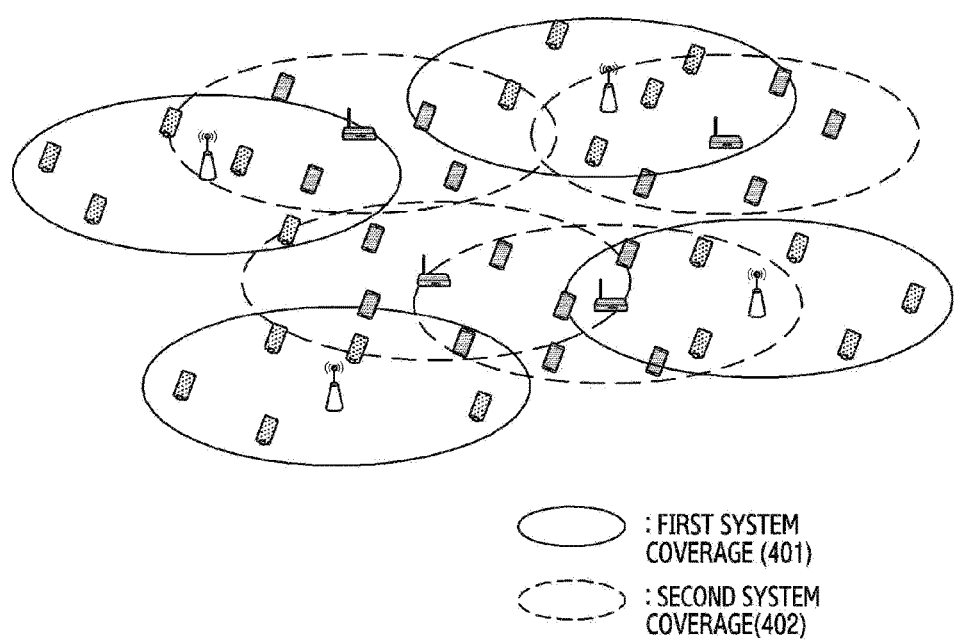
FIG. 4 illustrates an example of cell configuration for sharing a band between a wireless communication system and other system according to an embodiment of the present disclosure.

FIG. 4 illustrates cell configuration for sharing a band between a wireless communication system and other wireless communication system according to an embodiment of the present disclosure. In FIG. 4, the system according to an embodiment of the present disclosure is referred to as a first system 301, and the other system is referred to as a second system 302. Referring to FIG. 4, coverage 401 of the first system 301 and coverage 402 of the second system 302 coexist. Accordingly, interference can arise between the first system 310 and the second system 302. Hence, according to various embodiments to be explained, an eNB or a control node of the first system 301 can perform operations for fair band sharing between the first system 310 and the second system 302.

Figure 5:
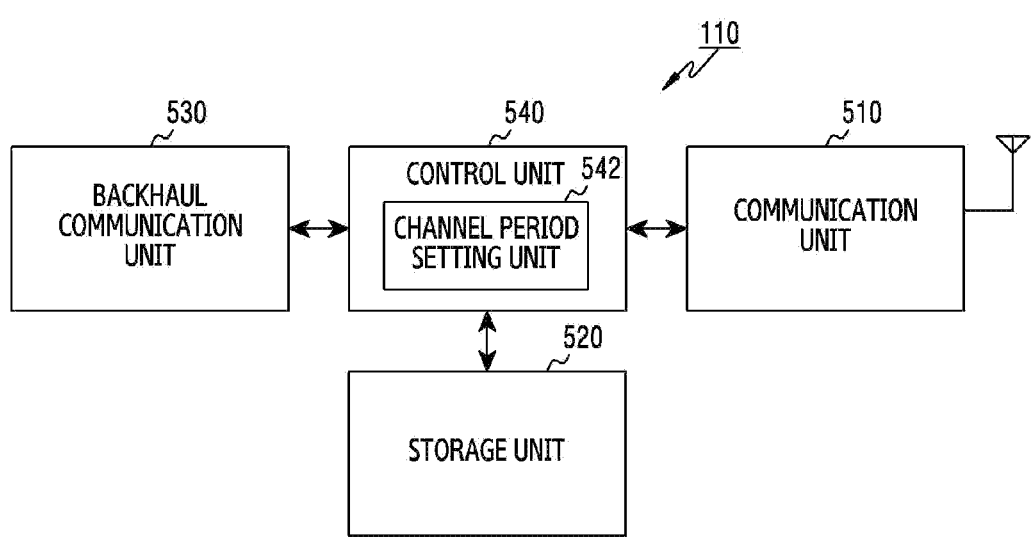
FIG. 5 illustrates a block diagram of an evolved Node B (eNB) in a wireless communication system according to an embodiment of the present disclosure.

FIG. 5 illustrates a block diagram of an eNB in a wireless communication system according to an embodiment of the present disclosure. FIG. 5 illustrates a structure of the eNB 110. Hereafter, a term such as "unit" and "part" indicates a unit for processing at least one function or operation, and can be implemented using hardware, software, or an combination of hardware and software.

Referring to FIG. 5, the eNB includes a communication unit 510, a storage unit 520, a backhaul communication unit 530, a control unit 540, and a channel period setting unit 542.

The communication unit 510 performs functions for sending and receiving signals over a radio channel. For example, the communication unit 510 performs a conversion function between a baseband signal and a bit string according to a physical layer standard of a system. For data transmission, the communication unit 510 generates complex symbols by encoding and modulating a transmit bit string. Also, in data reception, the communication unit 510 restores a receive bit string by demodulating and decoding a baseband signal. Also, the communication unit 510 up-converts the baseband signal to a Radio Frequency (RF) band signal, transmits it via an antenna, and down-converts an RF band signal received via the antenna to a baseband signal. For example, the communication unit 510 can include a transmit filter, a receive filter, an amplifier, a mixer, an oscillator, a Digital to Analog Convertor (DAC), an Analog to Digital Convertor (ADC), and the like.

Also, the communication unit 510 can include a plurality of RF chains. Further, the communication unit 510 can conduct the beamforming. For the beamforming, the communication unit 510 can adjust a phase and a magnitude of signals transmitted and received via a plurality of antennas or antenna elements.

The communication unit 510 sends and receives the signals as mentioned above. Hence, the communication unit 510 can be referred to as a transmitting unit, a receiving unit, or a transceiving unit. In addition, the communication unit 510 may further include a transceiver as a specific hardware.

The storage unit 520 stores a basic program for operating the eNB, an application program, and data such as setting information. In particular, the storage unit 520 can store a codebook for the beamforming of a data signal. Also, the storage unit 520 provides the stored data according to a request of the control unit 540.

The backhaul communication unit 530 provides an interface for communicating with other nodes in a network. That is, the backhaul communication unit 530 converts a bit string transmitted from the eNB to other node, for example, other eNB, a control node, or a core network, to a physical signal, and converts a physical signal received from the other node to a bit string.

The control unit 540 controls general operations of the eNB. For example, the control unit 540 sends and receives signals through the communication unit 510. Also, the control unit 540 records and reads data in and from the storage unit 520. For doing so, the control unit 540 can include at least one processor. According to an embodiment of the present disclosure, the control unit 540 includes the channel period setting unit 542 which sets an occupancy period and an unoccupancy period for the channel based on activity information of a channel in a band shared with other system. Herein, the occupancy period can be referred to as a COT, and the unoccupancy period can be referred to as an IT. For example, the control unit 540 can control the eNB to execute processes of FIG. 8, FIG. 9, FIG. 11, FIG. 12, FIG. 14, FIG. 15, FIG. 17, FIG. 19, FIG. 21, FIG. 23, and FIG. 25.

Figure 6:
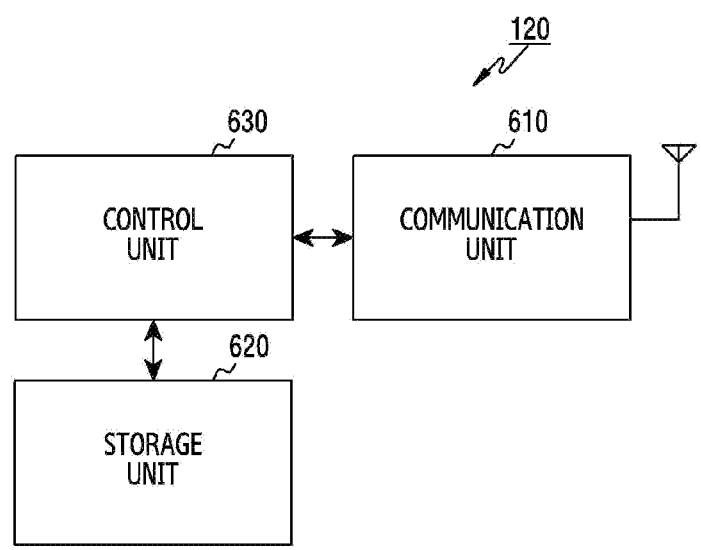
FIG. 6 illustrates a block diagram of a User Equipment (UE) in a wireless communication system according to an embodiment of the present disclosure.

FIG. 6 illustrates a block diagram of a UE in a wireless communication system according to an embodiment of the present disclosure. FIG. 6 illustrates a structure of the UE 120. Hereafter, a term such as "unit" and "part" indicates a unit for processing at least one function or operation, and can be implemented using hardware, software, or a combination of hardware and software.

Referring to FIG. 6, the UE includes a communication unit 610, a storage unit 620, and a control unit 630.

The communication unit 610 performs functions for sending and receiving signals over a radio channel. For example, the communication unit 610 performs a conversion function between a baseband signal and a bit string according to a physical layer standard of a system. For example, for data transmission, the communication unit 610 generates complex symbols by encoding and modulating a transmit bit string. Also, in data reception, the communication unit 610 restores a receive bit string by demodulating and decoding a baseband signal. Also, the communication unit 610 up-converts the baseband signal to an RF band signal, transmits it via an antenna, and down-converts an RF band signal received via the antenna to a baseband signal. For example, the communication unit 610 can include a transmit filter, a receive filter, an amplifier, a mixer, an oscillator, a DAC, an ADC, and the like. The communication unit 610 sends and receives the signals as mentioned above. Hence, the communication unit 610 can be referred to as a transmitting unit, a receiving unit, or a transceiving unit. In FIG. 6, the UE includes one antenna. However, according to another embodiment of the present disclosure, the UE can include a plurality of antennas.

The storage unit 620 stores a basic program for operating the UE, an application program, and data such as setting information. In particular, the storage unit 620 can store a codebook for feedback of channel information. Also, the storage unit 620 provides the stored data according to a request of the control unit 630.

The control unit 630 controls general operations of the UE. For example, the control unit 630 sends and receives signals through the communication unit 610. Also, the control unit 630 records and reads data in and from the storage unit 620. For doing so, the control unit 630 can include at least one processor. For example, the control unit 620 can include a Communication Processor (CP) for controlling communication and an Application Processor (AP) for controlling a higher layer such as an application program.

Figure 7:
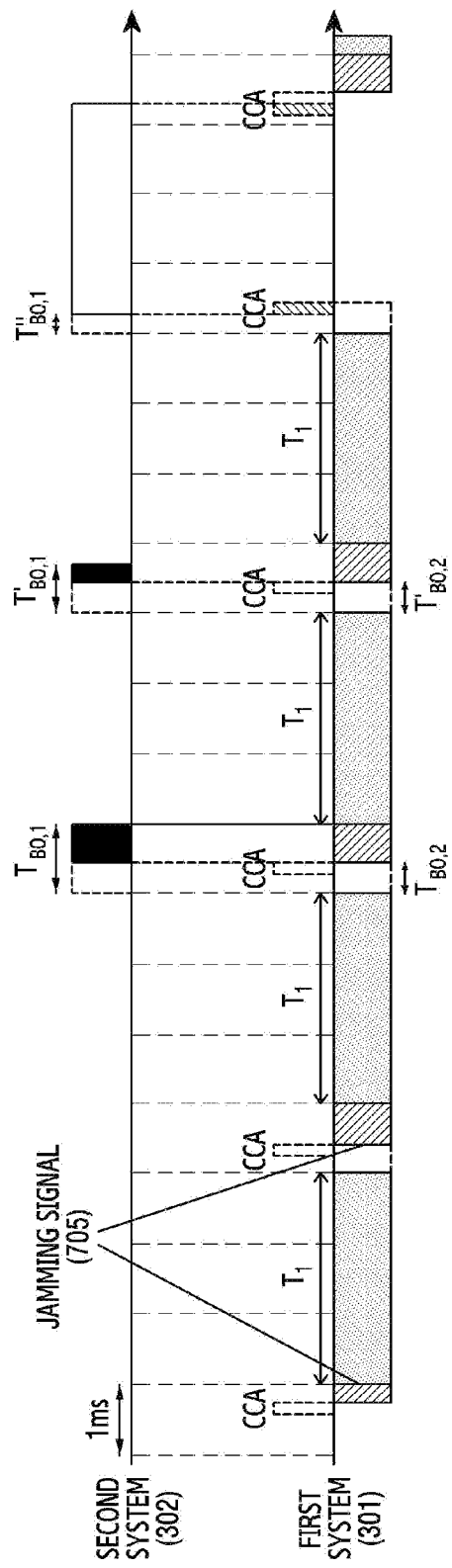
FIG. 7 illustrates competitive channel occupancy in a wireless communication system according to an embodiment of the present disclosure.

FIG. 7 illustrates competitive channel occupancy in a wireless communication system according to an embodiment of the present disclosure. In FIG. 7, the first system 301 operates in a synchronous manner and the second scheme 302 operates in an asynchronous manner.

Referring to FIG. 7, according to the LBT scheme, when any one of the first system 301 and the second system 302 wins contention, it can use a channel for a certain time, that is, for an occupancy period. At this time, a length of the occupancy period can be defined to be $(13/32)*q$ ms or less, and the channel occupancy ends when the occupancy period elapses. Herein, q can be determined as a value between 4 and 32. For the contention, a random back-off value is used. That is, the first system 301 and the second system 302 each generate their random back-off value and send a signal at a time determined by the random back-off value in an unoccupancy period. In so doing, the system which first sends the signal wins the contention. A length of the random back-off value can be determined by a NxClear Channel Assessment (CCA) spacing or slot, where N can be selected randomly between 1 and the q value. Also, a product of the N and CCA can be referred to as an extended CCA. Hence, the CCA slot becomes a minimum unit for the random back-off.

The first system 310 and the second system 302 can determine a channel occupancy state of other system through Energy Detection (ED). More specifically, an eNB of the first system 301 can accumulate and average signal strengths received over a channel during the CCA spacing time, and determine channel unoccupancy when the average does not exceeds a predefined criterion. Hence, the eNB can reduce a next random back-off time by 1 CCA slot. By contrast, when the average exceeds the predefined criterion, the eNB determines that other system (e.g., the second system 302) is using the channel, and maintains the next random back-off time. Accordingly, as shown in FIG. 7, the first system 301 operates occupancy periods $T_1$ and unoccupancy periods $T_{B0,2}$ and $T_{B0,2}$. When the occupancy periods end, the second system 302 or the first system 301 generates the random back-off value and determines a next system which is to occupy the channel according to a contention result using the random back-off value.

According to an embodiment of the present disclosure, the second system 302 can operate in the asynchronous manner, and the first system 301 can provide a communication service on a synchronized sub-frame unit. In this case, the eNB of the first system 301 schedules a resource to be allocated to the UE on the subframe unit and orthogonally operates between UEs through the allocated resource. To implement load-based LBT or frame-based LBT, the channel occupancy of the first system 301 needs to be performed on the subframe basis. Even when the first system 301 which needs to operate in a subframe based synchronous manner occupies the channel first, since transmission of resource allocation scheduling information per user is feasible in a next subframe, the eNB of the first system 301 broadcasts a jamming signal 705 to occupy the channel up to a start point of the next subframe. Hence, even when the first system 301 does not perform the communication, no system can use the channel while the first system 301 broadcasts the jamming signal 705. Also, in FIG. 7, load of the first system 301 is relatively higher than load of the second system 302, and the first system 301 continually tries the channel occupancy. The back-off value of the second system 302 is relatively greater than the back-off value of the first system 301, and the first system 301 always occupies the channel first in a contention period. For example, the unoccupancy period $T_{B0,1}$ of the second system 302 is greater than the unoccupancy period $T_{B0,2}$ of the first system 301.

As such, FIG. 7 illustrates two problems occurring when the frame-based LBT scheme and the load-based LBT scheme are applied to the first system 301 and the second system 302. The first is to transmit a packet after occupying the channel corresponding to the occupancy period continuously fixed due to the high load of the first system 301. The second is a situation where no system can use the channel because the first system 301 sends the jamming signal 705 for the synchronous transmission on the subframe unit. That is, every time the first system 301 occupies the channel, the resource corresponding to the transmission period of the jamming signal 705 is wasted and accordingly the channel is inefficiently used. Meanwhile, when the second system 302 using CSMA/CA suffers from severe interference due to a hidden node, the second system 302 uses a relatively greater back-off value than the back-off value of the first system 301 according to exponential back-off increase and thus unfairness of the transmission opportunity can take place.

Figure 8:
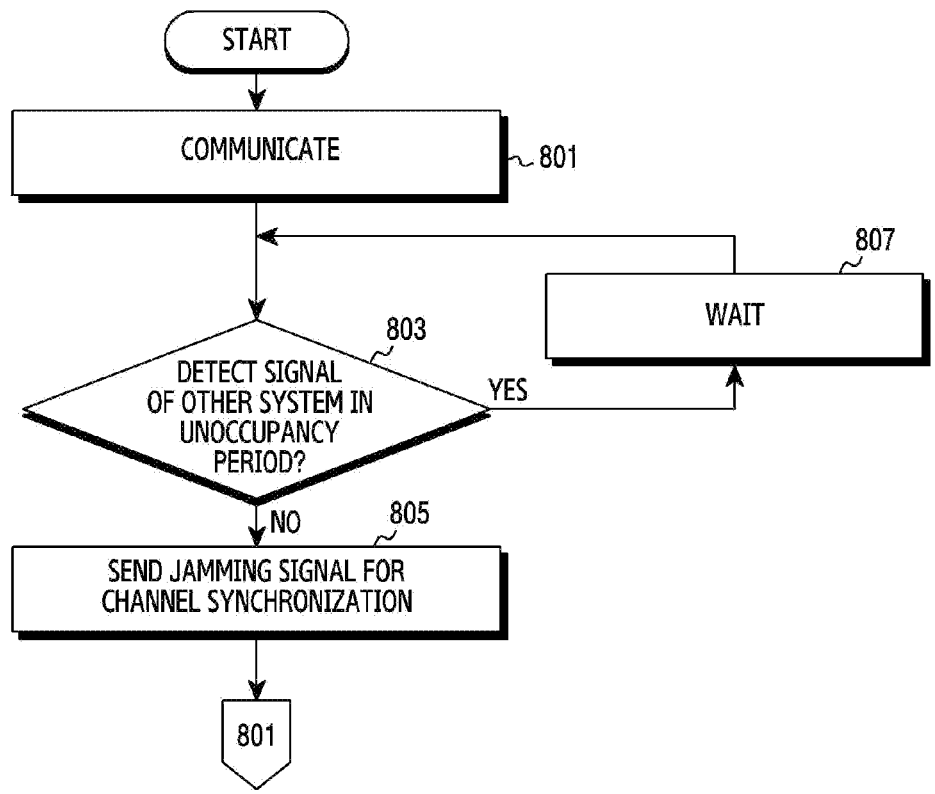
FIG. 8 illustrates a contention process for channel occupancy in a wireless communication system according to an embodiment of the present disclosure.

FIG. 8 illustrates a contention process for channel occupancy in a wireless communication system according to an embodiment of the present disclosure. FIG. 8 illustrates an operating method of the eNB 110 of the first system 301.

Referring to FIG. 8, the eNB performs communication in operation 801. The eNB can perform synchronous communication with at least one UE over subframes. Specifically, the eNB can schedule a resource to be allocated to the at least one UE, and conduct the communication over the scheduled resource. The eNB perform the communication until an occupancy period expires.

Next, the eNB determines whether a signal of other system (e.g., the second system 302) is detected in an unoccupancy period in operation 803. Whether the signal of the other system is detected or not can be determined through ED. For example, the eNB can calculate an average of signal strengths received for a certain time, compare the average with a threshold, and thus determine whether the signal of the other system exists.

When detecting no signal of the other system, the eNB sends a jamming signal for channel synchronization in operation 805. That is, as the channel occupancy commences not at a start point of a subframe, the eNB sends the jamming signal to maintain the channel occupancy. When the channel occupancy commences at the start point of the subframe, the operation 805 can be omitted. Next, the eNB returns to the operation 801.

By contrast, when detecting the signal of the other system, the eNB waits until a next unoccupancy period in operation 807. That is, the eNB waits without the communication until a next contention. Next, the eNB returns to the operation 803.

Figure 9:
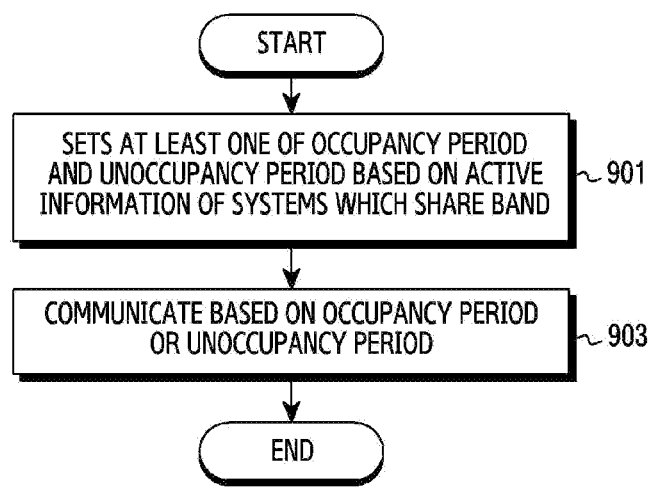
FIG. 9 illustrates an operating process of an eNB in a wireless communication system according to an embodiment of the present disclosure.

FIG. 9 illustrates an operating process of an eNB in a wireless communication system according to an embodiment of the present disclosure. FIG. 9 illustrates an operating method of the eNB 110 of the first system 301.

Referring to FIG. 9, the eNB sets at least one of an occupancy period and an unoccupancy period based on active information of systems which share one band in operation 901. Herein, the active information includes at least one of whether each system occupies a channel, a channel occupancy time of each system, and an interference level of each system on other system. The occupancy period can be referred to as an occupancy time, a channel occupancy time, a channel using time, a channel using period, or a using period. The unoccupancy period can be referred to as an unoccupancy time, a channel unoccupancy time, a channel un-using time, a channel un-using period, an un-using time period, an idle time, or an idle period. Also, the band can include an unlicensed band for the eNB.

Next, the eNB can perform communication based on the occupancy period and the unoccupancy period in operation 903. For example, the eNB can communication with at least one UE, that is, send and receive control signals and data signals in the occupancy period. When the occupancy period ends, the eNB competes with other system which shares the band in the unoccupancy period. In so doing, whether to conduct the communication in a next occupancy period differs depending on a contention result.

As such, the eNB can determine the length of at least one of the occupancy period and the unoccupancy period based on the active information of the system of the eNB or the other system which shares the channel. Hereafter, the present disclosure describes various embodiments for determining the length of at least one of the occupancy period and the unoccupancy period. Various embodiments to be explained can be realized independently, or two or more of the embodiments can be realized together.

Figure 10:
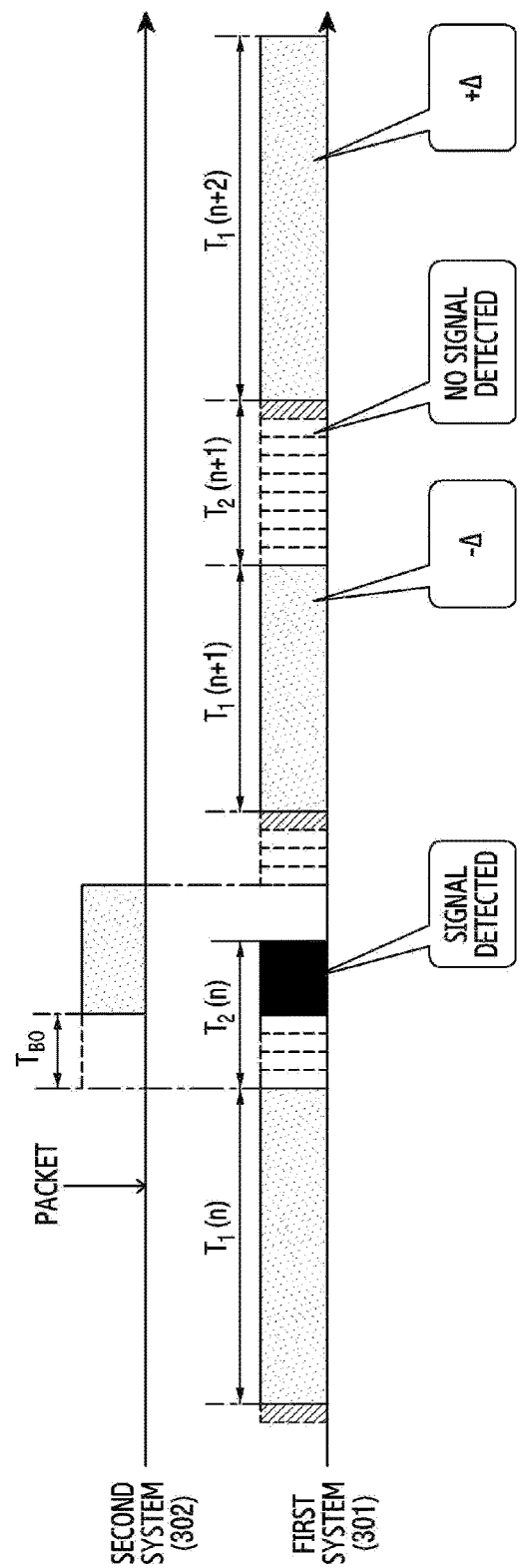
FIG. 10 illustrates adjustment of an occupancy period according to channel occupancy of other system in a wireless communication system according to an embodiment of the present disclosure.

FIG. 10 illustrates adjustment of an occupancy period according to channel occupancy of other system in a wireless communication system according to an embodiment of the present disclosure. Herein, the other system includes the second system 302. Hereafter, to ease the understanding, while the first system 302 measures a signal and adjusts the occupancy period, the signal measurement and the occupancy period adjustment can be conducted by a device of the first system 301. For example, the device can include the eNB 110 or other control node than the eNB 110.

Referring to FIG. 10, the first system 301 performs ED on a CCA slot basis in a period $T_2$. When measuring a signal having a level over a specific reference value, the first system 301 determines that the second system 302 is already using a channel. Such determination predicts that the second system 302 which is using the channel has traffic to process and continuously tries to access the channel until the traffic is processed. By contrast, when measuring a signal having the level below the specific reference value in the ED, the first system 301 determines that no system is using the channel. Such determination predicts that the other systems including the second system 302 have no traffic to process and a load level of the second system 302 is low.

Thus, the first system 301 can adaptively adjust the occupancy period using indirect information about the channel load level of the second system 302. Herein, the indirect information about the channel load state includes the comparison result of the signal level of the second system 302 with the specific reference value. When the load level of the second system 302 is high, much traffic to currently transmit is predicted and accordingly the first system 301 reduces the length of the occupancy period. As a result, the second system 302 can get more opportunities to process the traffic. By contrast, when the load level of the second system 302 is low, this implies that the second system 302 has less traffic to currently transmit and accordingly the first system 301 increases the length of the occupancy period. Thus, an environment for rapidly processing the traffic of the first system 301 is provided.

FIG. 10 illustrates a method for adaptively adjusting an occupancy period of the first system 301 based on a measured load level of an indirect channel. Referring to FIG. 10, as a signal of the second system 302 is detected in an n-th unoccupancy period, a length of an (n+1)-th occupancy period can be adjusted based on Equation 1.

$$T_1(n+1)=T_1(n)-\Delta \qquad \text{Equation 1}$$

In Equation 1, $T_1(n)$ denotes a length of the n-th occupancy period, $T_1(n+1)$ denotes the length of the (n+1)-th occupancy period, and $\Delta$ (delta) denotes a change of the occupancy period length. At this time, the length of the occupancy period is adjusted in a range of predefined maximum value and minimum value. For example, the minimum value can be defined as 1 ms, and the maximum value can be defined as 13 ms.

Also, as a signal of the second system 302 is not detected in the (n+1)-th unoccupancy period, a length of an (n+2)-th occupancy period can be adjusted based on Equation 2.

$$T_1(n+2)=T_1(n+1)+\Delta \qquad \text{Equation 2}$$

In Equation 2, $T_1(n+2)$ denotes the length of the (n+2)-th occupancy period, $T_1(n+1)$ denotes the length of the (n+1)-th occupancy period, and $\Delta$ (delta) denotes the change of the occupancy period length.

When FIG. 10 is explained by referring to Equation 1 and Equation 2, the first system 301 communicates in the n-th occupancy period of the first system 301. Next, in the n-th unoccupancy period, the first system 301 detects a signal of the second system 302. Since the first system 301 detects the signal in the n-th unoccupancy period, the length $T_1(n+1)$ of the (n+1)-th occupancy period is determined based on Equation 1. That is, the length $T_1(n+1)$ of the (n+1)-th occupancy period reduces by $\Delta$ (delta). Next, in the (n+1)-th unoccupancy period, the first system 301 determines whether a signal of the second system 302 is detected. When not detecting the signal of the second system 302, the length $T_1(n+2)$ of the (n+2)-th occupancy period increases from the length $T_1(n+1)$ of the (n+1)-th occupancy period by $\Delta$ (delta) based on Equation 2.

Figure 11:
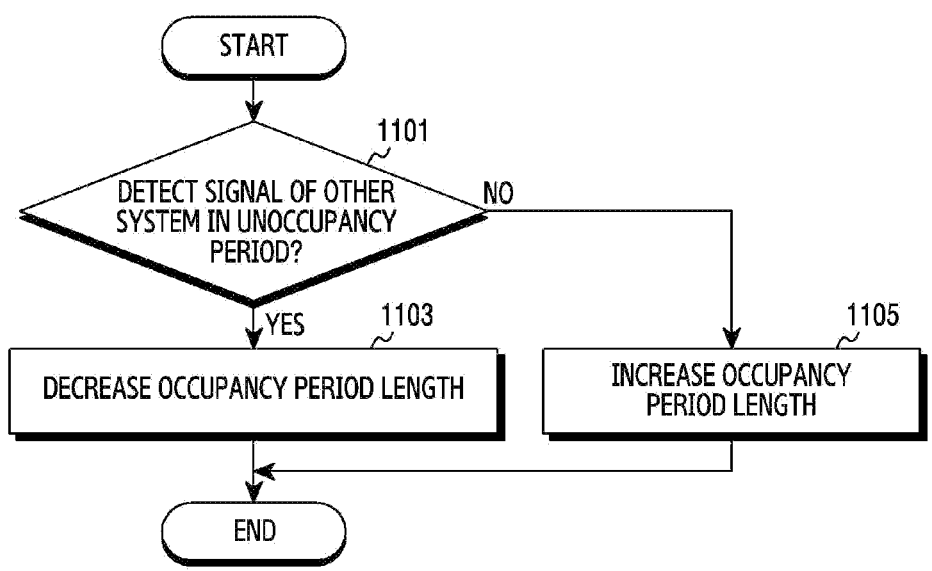
FIG. 11 illustrates a process for adjusting an occupancy period according to channel occupancy of other system in a wireless communication system according to an embodiment of the present disclosure.

FIG. 11 illustrates a process for adjusting an occupancy period according to channel occupancy of other system in a wireless communication system according to an embodiment of the present disclosure. FIG. 11 illustrates an operating method of the eNB 110 for adjusting the occupancy period of FIG. 10.

Referring to FIG. 11, the eNB determines whether a signal of other system (e.g., the second system 302) is detected in an unoccupancy period in operation 1101. Whether the signal of the other system is detected or not can be determined through ED. For example, the eNB can calculate an average of signal strengths received for a certain time, compare the average with a threshold, and thus determine whether the signal of the other system exists.

When detecting the signal of the other system, the eNB decreases the length of the occupancy period in operation 1103. Whether the signal is detected or not is information indirectly indicating load of the other system. Accordingly, the signal detected can be interpreted as relatively high load of the other system, the eNB reduces the length of the occupancy period so that the second system 302 can have more channel occupancy opportunities.

By contrast, when detecting no signal in the other wireless communication system, the eNB increases the length of the occupancy period in operation 1105. Whether the signal is detected or not is the information indirectly indicating the load of the other system. Accordingly, since the signal detected can be interpreted as relatively low load of the other system, the eNB reduces the length of the occupancy period so that the first system 301 can have more channel occupancy opportunities.

In the embodiment of FIG. 11, the length of the occupancy period of the first system 301 increases or decreases according to the channel occupancy, that is, on/off of the second system 302. In so doing, the increased or decreased size can adaptively change according to the current occupancy period length. For example, when the current occupancy period length is relatively small, the increase can be relatively great. By contrast, when the current occupancy period length is relatively great, the increase can be relatively small. Specifically, the occupancy period length can be adjusted as shown in FIG. 12.

Figure 12:
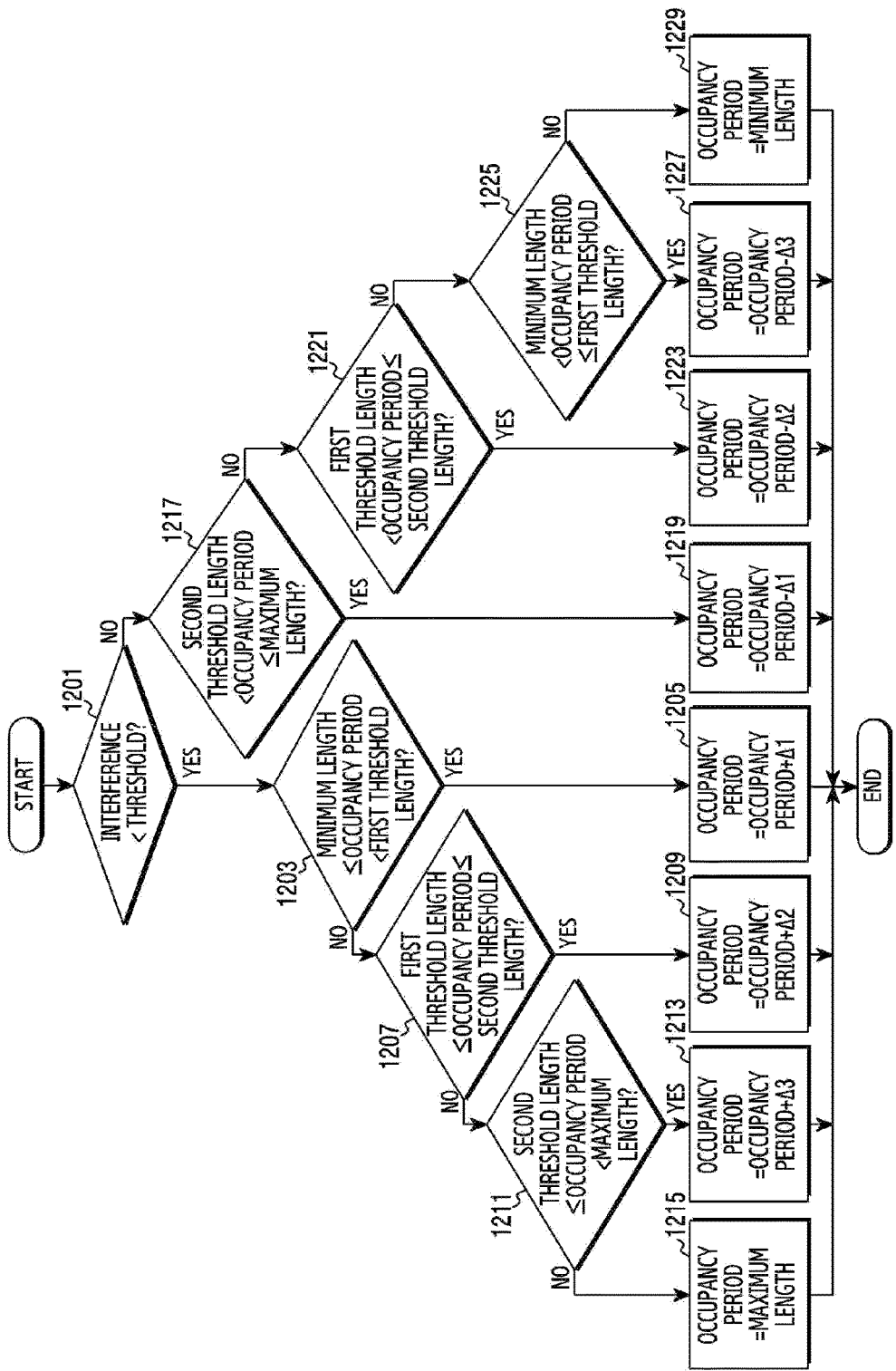
FIG. 12 illustrates another process for adjusting an occupancy period according to channel occupancy of other system in a wireless communication system according to an embodiment of the present disclosure.

FIG. 12 illustrates another process for adjusting an occupancy period according to channel occupancy of other system in a wireless communication system according to an embodiment of the present disclosure. FIG. 12 illustrates an operating method of the eNB 110 for adjusting the occupancy period of FIG. 10.

Referring to FIG. 12, the eNB determines whether interference from the second system 302 exceeds a threshold in operation 1201. That is, the eNB determines a channel sharing state with the second system 302. The interference can be determined through ED on the second system 302. The interference can include a sum or an average of signal strengths for the second system 302. Herein, the interference exceeding the threshold implies that the second system 302 occupies a channel.

When the interference from the second system 302 exceeds the threshold, the eNB determines whether a current occupancy period length is greater than or equal to a minimum length of the occupancy period and concurrently is smaller than a first threshold length of the occupancy period in operation 1203. Herein, the minimum length can be referred to as COT_min, and the first threshold length can be referred to as COT_thres1. When the current occupancy period length is greater than or equal to the minimum length and concurrently is smaller than the first threshold length, the eNB determines a next occupancy period length by adding Δ1 to the current occupancy period length in operation 1205.

By contrast, when the current occupancy period length is greater than or equal to the first threshold length, the eNB determines whether the current occupancy period length is greater than or equal to the first threshold length and concurrently is smaller than a second threshold length in operation 1207. Herein, the second threshold length can be referred to as COT_thres2. When the current occupancy period length is greater than or equal to the first threshold length and concurrently smaller than the second threshold length, the eNB determines a next occupancy period length by adding Δ2 to the current occupancy period length in operation 1209.

By contrast, when the current occupancy period length is greater than or equal to the second threshold length, the eNB determines whether the current occupancy period length is greater than or equal to the second threshold length and concurrently is smaller than a maximum length of the occupancy period in operation 1211. Herein, the maximum length can be referred to as COT_max. When the current occupancy period length is greater than or equal to the second threshold length and concurrently smaller than the maximum length of the occupancy period, the eNB determines a next occupancy period length by adding Δ3 to the current occupancy period length in operation 1213. By contrast, when the current occupancy period length is equal to the maximum length, the eNB determines the next occupancy period length as the maximum length in operation 1215.

In operation 1201, when the interference from the second system 302 does not exceed the threshold, the eNB compares the current occupancy period length with the second threshold length and the maximum length of the occupancy period in operation 1217. When the current occupancy period length is greater than the second threshold length and concurrently smaller than or equal to the maximum length, the eNB determines a next occupancy period length by subtracting Δ1 from the current occupancy period length in operation 1219.

By contrast, when the current occupancy period length is smaller than or equal to the second threshold length, the eNB determines whether the current occupancy period length is greater than the first threshold of the occupancy period and concurrently smaller than or equal to the second threshold length in operation 1221. When the current occupancy period length is greater than the first threshold of the occupancy period and concurrently smaller than or equal to the second threshold length, the eNB determines the next occupancy period length by subtracting Δ2 from the current occupancy period length in operation 1223.

By contrast, when the current occupancy period length is smaller than or equal to the first threshold length, the eNB determines whether the current occupancy period length is greater than the minimum threshold of the occupancy period and concurrently smaller than or equal to the first threshold length in operation 1225. When the current occupancy period length is greater than the minimum threshold of the occupancy period and concurrently smaller than or equal to the first threshold length, the eNB determines a next occupancy period length by subtracting Δ3 from the current occupancy period length in operation 1227. By contrast, when the current occupancy period length is equal to the minimum length, the eNB determines the minimum length as the next occupancy period length in operation 1229.

In the above-stated process, Δ1, Δ2, and Δ3 are the changes of the occupancy period length and are defined as different values. For example, Δ1 can be defined as a value greater than Δ2, and Δ2 can be defined as a value greater than Δ3.

Figure 13:
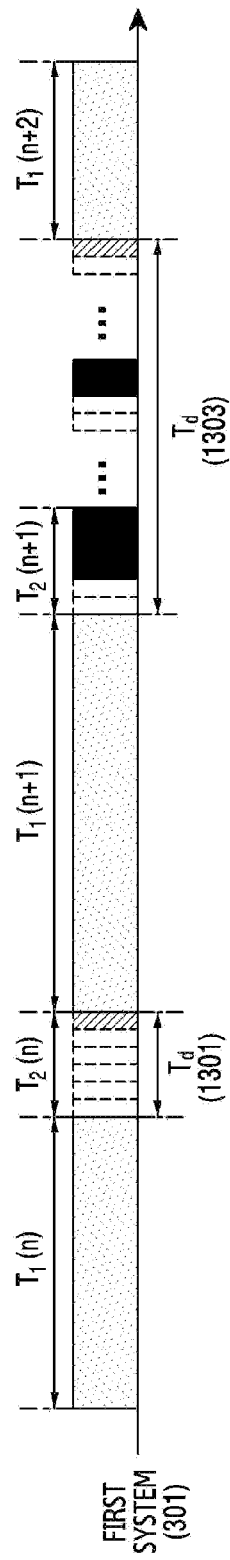
FIG. 13 illustrates adjustment of an occupancy period based on delay measurement in a wireless communication system according to an embodiment of the present disclosure.

FIG. 13 illustrates adjustment of an occupancy period based on delay measurement in a wireless communication system according to an embodiment of the present disclosure. Hereafter, for the understanding, while it is described that the first system 301 measures a signal and adjusts an occupancy period, the signal measurement and the occupancy period adjustment can be carried out by a device of the first system 301. For example, the device can include the eNB 110 or other control node than the eNB 110.

Referring to FIG. 13, the first system 301 measures a time interval between two consecutive occupancy periods and sets a length of a next occupancy period according to a size of the delay. When the first system 301 wins contention in an unoccupancy period, the size of the delay is equal to a length of the unoccupancy period. However, when the first system 301 loses the contention in the unoccupancy period, the size of the delay is a sum of lengths of unoccupancy periods and intervals between the unoccupancy periods. That is, the size of the delay can vary based on whether the system wins or loses the contention, a random back-off value, and so on.

Referring to FIG. 13, after an n-th occupancy period ends, an n-th unoccupancy period starts. At this time, the first system 301 wins the contention. Hence, the delay size $T_d$ between the n-th occupancy period and an (n+1)-th occupancy period is equal to a length $T_2(n)$ of the n-th unoccupancy period. In so doing, when the length $T_2(n)$ of the n-th unoccupancy period is equal to or smaller than a minimum value of the delay, a length of a next occupancy period is set to a maximum length. This can be expressed as Equation 3.

$$T_1(n+1)=T_{COT_{min}} \text{ if } T_d T_2(n)=T_{d_{min}} \qquad \text{Equation 3}$$

Equation 3, $T_1(n+1)$ denotes the length of the (n+1)-th occupancy period, $T_{COT_{max}}$ denotes a maximum length, $T_d$ denotes the size of the delay, $T_2(n)$ denotes the length of the n-th unoccupancy period, and $T_{d_{min}}$ denotes the minimum value of the delay.

After the (n+1)-th occupancy period ends, the (n+1)-th unoccupancy period starts. At this time, the first system 301 loses the contention. After losing at least one contention in a plurality of unoccupancy periods including the (n+1)-th unoccupancy period, the first system 301 wins the contention. Thus, the delay size $T_d$ between the (n+1)-th occupancy period and an (n+2)-th occupancy period is greater than a length $T_2(n+1)$ of the (n+1)-th unoccupancy period. In so doing, when the delay size $T_d$ is equal to or greater than a maximum value of the delay, a length of a next occupancy period is set to a minimum length. This can be expressed as Equation 4.

$$T_1(n+2)=T_{COT_{max}} \text{ if } T_d=T_{d_{max}} \qquad \text{Equation 4}$$

Equation 3, $T_1(n+2)$ denotes the length of the (n+2)-th occupancy period, $T_{COT_{min}}$ denotes the minimum length, $T_d$ denotes the delay size, and $T_{d_{min}}$ denotes the maximum value of the delay.

When the size of the delay is greater than the minimum value of the delay and smaller than the maximum value of the delay, the length of the next occupancy period can be determined in a range between the maximum value and the minimum value based on the delay size. This can be expressed as Equation 5.

$$T_1(n+1)=f(T_d)\cdot T_{COT_{max}} \text{ if } T_{d_{min}}<T_d<T_{d_{max}} \qquad \text{Equation 5}$$

Equation 5, $T_1(n+1)$ denotes the length of the next occupancy period, $T_{COT_{max}}$ denotes the maximum length of the occupancy period, $f(T_d)$ denotes a delay weighting factor determined based on the delay size, $T_d$ denotes the size of the delay, $T_{d_{min}}$ denotes the minimum value of the delay, and $T_{d_{max}}$ denotes the maximum value of the delay. The delay weighting factor adjusts the length of the occupancy period with a value between the minimum length and the maximum length. The delay weighting factor can decrease as the delay size increases.

Figure 14:
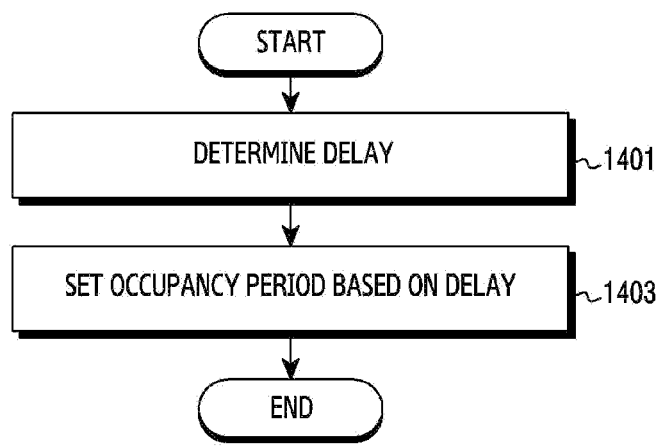
FIG. 14 illustrates a process for adjusting an occupancy period based on delay measurement in a wireless communication system according to an embodiment of the present disclosure.

FIG. 14 illustrates a process for adjusting an occupancy period based on delay measurement in a wireless communication system according to an embodiment of the present disclosure. FIG. 14 illustrates an operating method of the eNB 110 for adjusting the occupancy period of FIG. 13.

Referring to FIG. 14, the eNB determines delay in operation 1401. The delay is an interval between two occupancy periods, and indicates an interval from an end point of a recent occupancy period to a start point of a next occupancy period. Accordingly, when the eNB wins contention and a new occupancy period begins, the delay can be determined. As the system loses more contentions, a size of the delay increases.

Next, the eNB sets an occupancy period based on the delay in operation 1403. In other words, the eNB determines a length of the occupancy period based on the size of the delay. Specifically, when the size of the delay is over a maximum value, the eNB determines the occupancy period length as a maximum length. Alternatively, when the delay size is below a minimum value, the eNB determines the occupancy period length as a minimum length. Alternatively, when the delay size is below the maximum value and over the minimum value, the eNB determines a weight corresponding to the delay size and determines the length of the occupancy period according to the weight.

Figure 15:
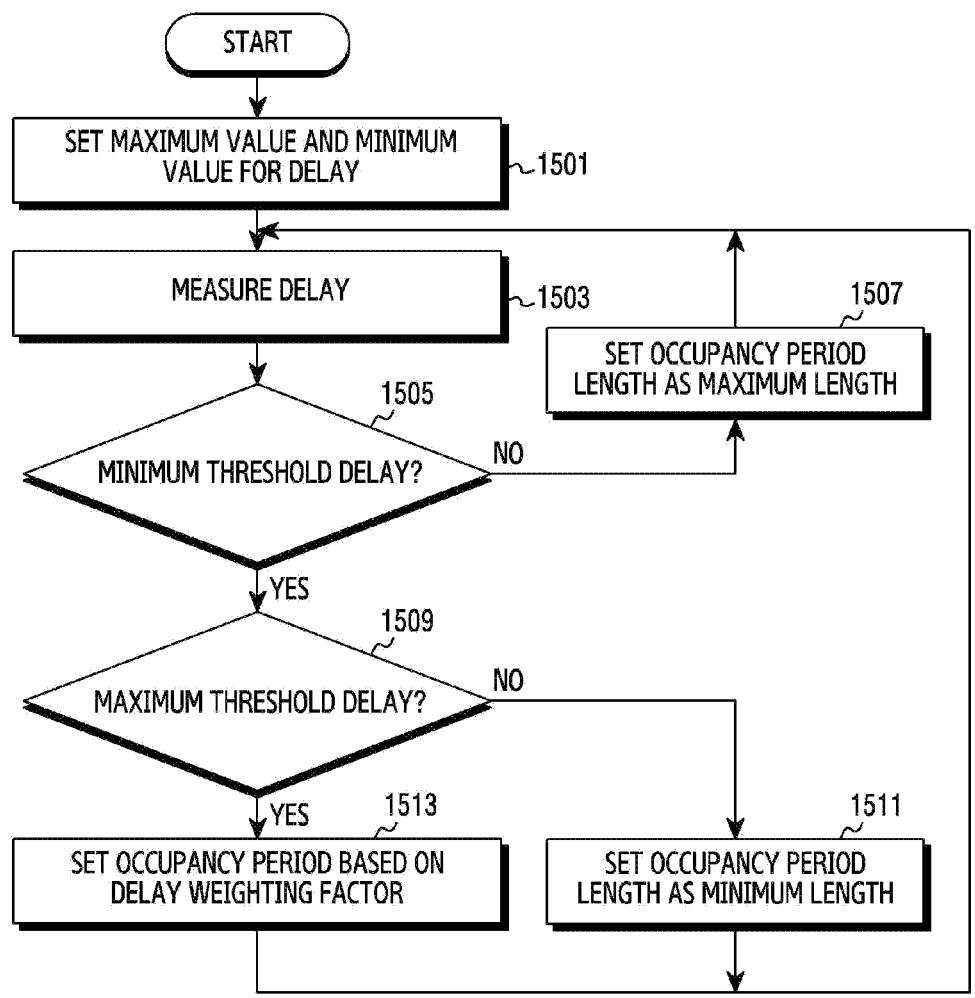
FIG. 15 illustrates another process for adjusting an occupancy period based on delay measurement in a wireless communication system according to an embodiment of the present disclosure.

FIG. 15 illustrates another process for adjusting an occupancy period based on delay measurement in a wireless communication system according to an embodiment of the present disclosure. FIG. 15 illustrates an operating method of the eNB 110 for adjusting the occupancy period of FIG. 13.

Referring to FIG. 15, the eNB sets a maximum value and a minimum value for delay in operation 1501. Next, the eNB measures the delay in operation 1503. Next, the eNB compares the minimum value with a size of the delay in operation 1505. When the delay size is smaller than or equal to the minimum value, the eNB sets a length of a next occupancy period as a maximum length in operation 1507. By contrast, when the delay size is greater than the minimum value, the eNB compares the measured delay size with the maximum value in operation 1509. When the delay size is greater than or equal to the maximum value, the eNB sets the next occupancy period length as a minimum length in operation 1511. By contrast, when the delay size is smaller than the maximum value, the eNB sets the next occupancy period length based on a delay weighting factor in operation 1513.

Figure 16:
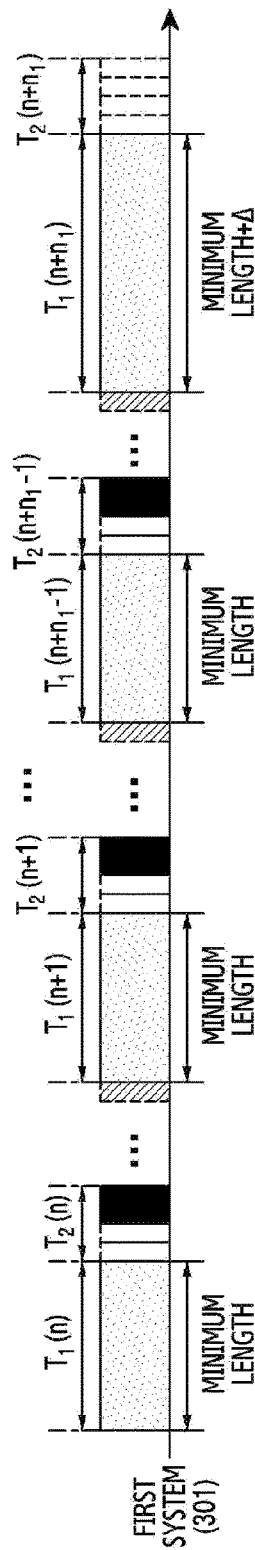
FIG. 16 illustrates an example of occupancy period adjustment based on the number of channel occupancy attempts of other system in a wireless communication system according to an embodiment of the present disclosure.

FIG. 16 illustrates an example of occupancy period adjustment based on the number of channel occupancy attempts of other system in a wireless communication system according to an embodiment of the present disclosure. Hereafter, to ease the understanding, while the first system 301 measures a signal and adjusts an occupancy period, the signal measurement and the occupancy period adjustment can be carried out by a device of the first system 301. For example, the device can include the eNB 110 or other control node than the eNB 110.

Referring to FIG. 16, the first system 301 performs ED on a CCA slot basis in an unoccupancy period. When measuring a signal having a level over a particular reference value, the first system 301 can predict that the second system 302 has traffic to process and continually attempts channel occupancy until the traffic is processed. Hence, thus, the first system 301 can adaptively adjust the occupancy period using indirect information about a channel load level of the second system 302. Herein, the indirect information about the channel load state includes a comparison result of the signal level of the second system 302 with the particular reference value and the number of times the second system 302 continually attempts the entry for the traffic processing.

As high traffic to currently transmit is predicted based on a high channel load level of the second system 302, the first system 301 reduces a length of the occupancy period. Accordingly, more opportunities are provided to the second system 302 to process the traffic. By contrast, when the load level of the second system 302 is low, it means less traffic to current transmit from the second system 302 and thus the first system 301 increases the length of the occupancy period. Therefore, an environment for rapidly processing the traffic of the first system 301 is provided.

In so doing, due to the continuous channel occupancy of the second system, the occupancy period length of the first system 301 can be maintained at the minimum length over a certain time of times. In this case, since the first system 301 performs downlink transmission over the occupancy period of the minimum length, traffic not yet processed can remain. That is, when the load level of a current channel is high, the occupancy period length can be of the minimum length and thus the remaining traffic can increase though the first system 301 still has traffic to transmit. This causes unfairness between the first system 301 and the second system. Hence, according to an embodiment of the present disclosure, the first system 301 can increase the occupancy period length according to an amount of the remaining traffic and maintain the increased length of the occupancy period until the remaining traffic is processed.

That is, when the occupancy period length is maintained at the minimum length over a predefined number of times, the first system increases the occupancy period length according to an amount of the remaining traffic. More specifically, the first system 301 can determine a change based on the amount of the remaining traffic and determine a length of a next occupancy period by adding the change to the minimum length. For example, the change can be proportional to the amount of the remaining traffic. For example, referring to FIG. 16, the first system 301 maintains the minimum length of the occupancy period in n-th through $(n+n_1-1)$-th occupancy periods. Namely, the first system 301 maintains the occupancy period of the minimum length for $n_1$ times. Hence, a length of an $(n+n_1)$-th occupancy period can be determined based on Equation 6.

$$T_1(n+n_1)=T_{COT_{min}}+\Delta \qquad \text{Equation 6}$$

In Equation 6, $T_1(n+n_1)$ denotes the length of the $(n+n_1)$-th occupancy period, $T_{COT_{min}}$ denotes the minimum length of the occupancy period, and $\Delta$ (delta) denotes a change of the occupancy period length.

Once the occupancy period length increases, although activity of the second system 302 is detected in an unoccupancy period, the first system 301 can maintain the increased occupancy period length until all the remaining traffic is processed. By contrast, when activity of the second system 302 is not detected in the unoccupancy period, the first system 301 can determine that the second system 302 has no traffic to currently process and the load level of the second system 302 is low. Thus, the first system 31 can increase the occupancy period length. In so doing, the length of the occupancy period can increase according to the embodiment of FIG. 10. As a result, an environment for processing the remaining traffic is provided to the first system 301, and the unfairness of the channel sharing between the first system 301 and the second system can be addressed.

Figure 17:
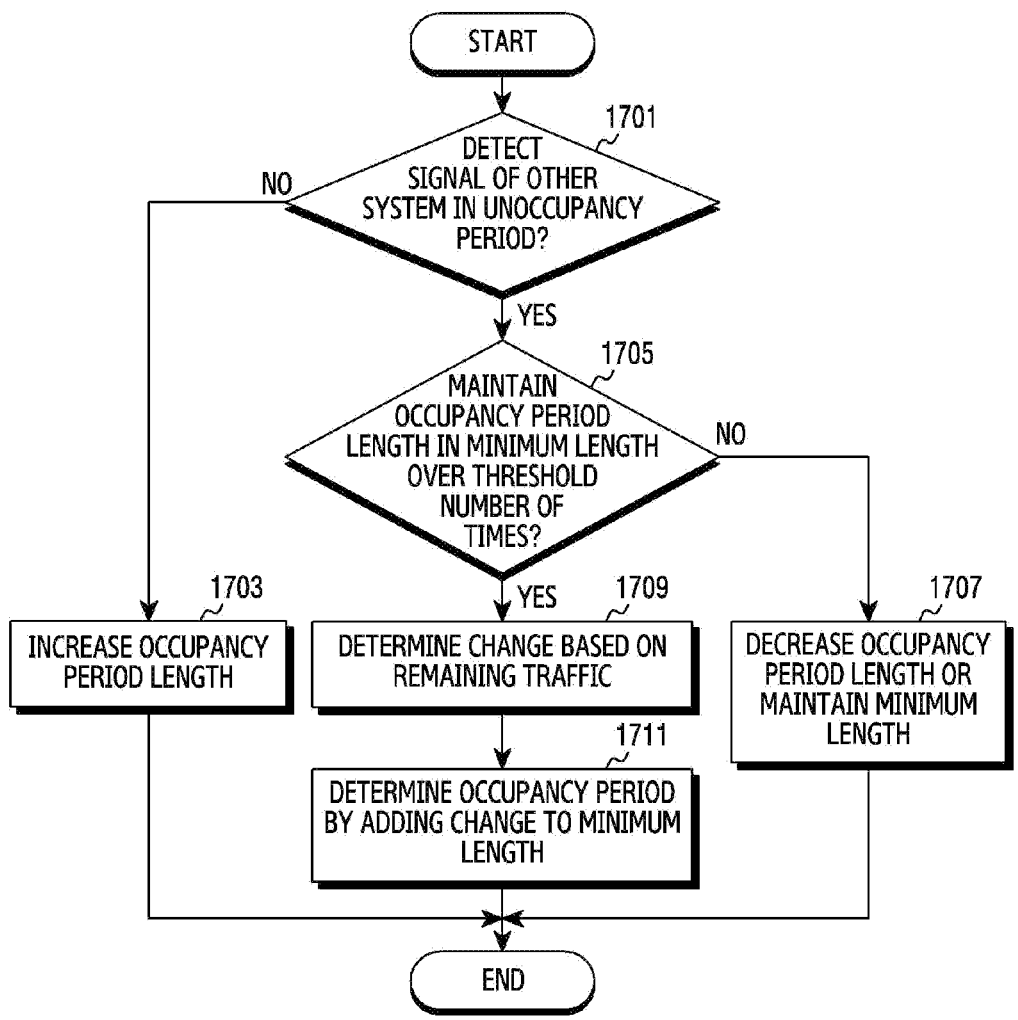
FIG. 17 illustrates a process for adjusting an occupancy period based on the number of channel occupancy attempts of other system in a wireless communication system according to an embodiment of the present disclosure.

FIG. 17 illustrates a process for adjusting an occupancy period based on the number of channel occupancy attempts of other system in a wireless communication system according to an embodiment of the present disclosure. FIG. 17 illustrates an operating method of the eNB 110 for adjusting the occupancy period of FIG. 16.

Referring to FIG. 17, the eNB determines whether a signal of other system (e.g., the second system 302) is detected in an unoccupancy period in operation 1701. Whether the signal of the other system is detected or not can be determined through ED. For example, the eNB can calculate an average of signal strengths received for a certain time, compare the average with a threshold, and thus determine whether the signal of the other system exists.

When detecting no signal of the other system, the eNB increases a length of an occupancy period in operation 1703. Whether the signal is detected or not is information indirectly indicating load of the other system. Accordingly, since the signal detected can be interpreted as relatively less load of the other system, the eNB reduces the length of the occupancy period so that the first system 301 can have more opportunities of the channel occupancy.

By contrast, when detecting the signal of the other system, the eNB determines whether an occupancy period of a minimum length is maintained over a threshold number of times in operation 1705. The length of the occupancy period can be set to the minimum length according to the channel occupancy of the other system. In so doing, the eNB determines whether the occupancy period length is set to the minimum length for the threshold number of times in succession.

When the occupancy period of the minimum length is not maintained over the threshold number of times, the eNB decreases the occupancy period length or maintains the minimum length in operation 1707. That is, when the occupancy period is currently not the minimum length, the eNB decreases the length of the occupancy period. At this time, the decrease can differ according to a current occupancy period length. By contrast, when the occupancy period is currently the minimum length, the eNB maintains the length of the occupancy period.

By contrast, when the occupancy period of the minimum length is maintained over the threshold number of times, the eNB sets the change for the occupancy period based on the remaining traffic in operation 1709. Herein, the remaining traffic includes traffic not processed due to the channel occupancy of the other system when the system of the eNB shares the channel with the other system.

Next, the eNB sets a value adding the change to the minimum length, as the occupancy period length in operation 1711. That is, the eNB increases the occupancy period length to process the remaining traffic, where the increase is determined based on the remaining traffic. Although not depicted in FIG. 17, the occupancy period length increased based on the remaining traffic can be maintained until the processing of the remaining traffic is completed. That is, the occupancy period length determined based on the remaining traffic can be maintained regardless of the channel occupancy of the other system.

Figure 18:
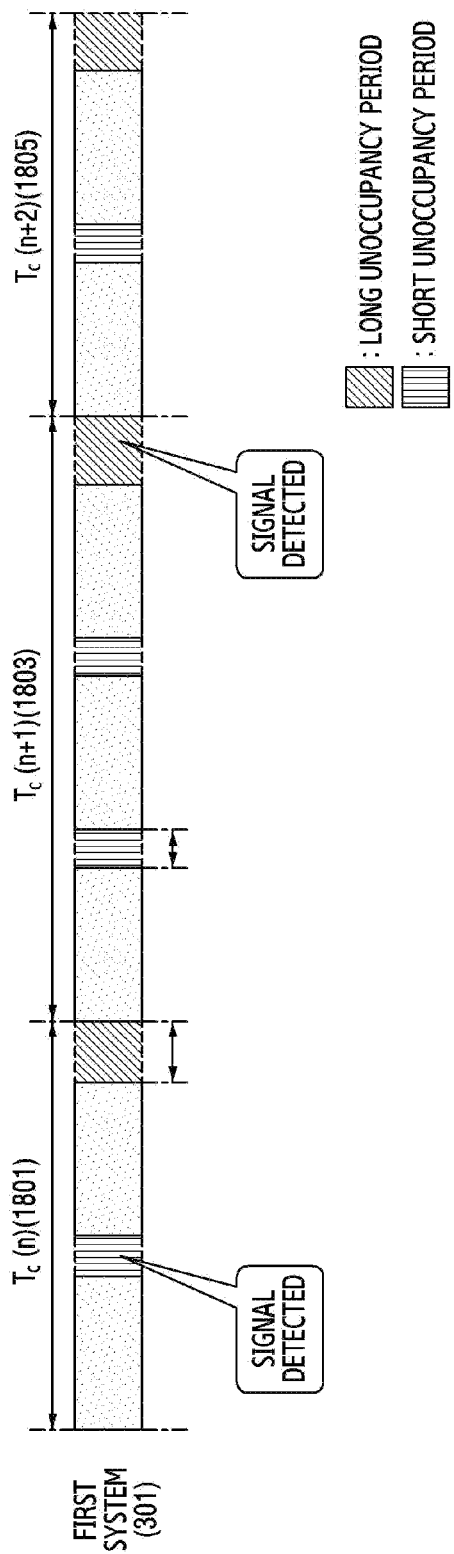
FIG. 18 illustrates unoccupancy period adjustment according to channel occupancy of other system in a wireless communication system according to an embodiment of the present disclosure.

FIG. 18 illustrates unoccupancy period adjustment according to channel occupancy of other system in a wireless communication system according to an embodiment of the present disclosure. Herein, the other system includes the second system 302. Hereafter, while the first system 301 measures a signal and adjusts the occupancy period to ease the understanding, the signal measurement and the occupancy period adjustment can be carried out by a device of the first system 301. For example, the device can include the eNB 110 or other control node than the eNB 110.

Referring to FIG. 18, the first system 301 performs ED on unoccupancy periods and determines whether a channel is used or not used. In so doing, according to an embodiment, the unoccupancy period is divided to a short unoccupancy period and a long unoccupancy period. The short unoccupancy period can be referred to as a first type unoccupancy period, and the long unoccupancy period can be referred to as a second type unoccupancy period. At least one short unoccupancy period and one long unoccupancy period form one interval, and the interval can be referred to as an idle time control interval. Herein, the number of the short unoccupancy periods in each interval can vary according to a signal detection result of the other system in a previous interval.

More specifically, the first system 301 determines whether the other system uses the channel in the short unoccupancy period and the long unoccupancy period of the interval, and indirectly measures a channel interference state based on the determined channel information. In so doing, when detecting a signal in the short unoccupancy period, the first system 301 can determine that the unoccupancy period of the other system which has traffic to currently process is smaller than the short unoccupancy period and the other system succeeds in the channel occupancy. This, indirectly, predicts that the interference state of the current channel is not serious and thus the unoccupancy period of the other system does not abruptly increase. On the contrary, when detecting a signal in the long unoccupancy period, the first system 301 can determine that the unoccupancy period of the other system which has traffic to currently process is greater than the short unoccupancy period. This predicts that the interference state of the current channel is serious and thus the unoccupancy period of the other system abruptly increases. Accordingly, the first system according to an embodiment of the present disclosure can adaptively adjust the ratio of the short unoccupancy period and the long unoccupancy period in one interval using the indirect information of the interference state of the channel. Thus, the number of the short unoccupancy periods can be adjusted as shown in Table 1.

TABLE 1

|  | short unoccupancy period | long unoccupancy period |
| --- | --- | --- |
| signal detection | $N_s(n + 1) = N_s(n) + 1$ | $N_s(n + 1) = N_s(n) - 1$ |
| no signal detection | $N_s(n + 1) = N_s(n)$ | $N_s(n + 1) = N_s(n)$ |

Table 1 shows equations showing an embodiment of a method for adaptively adjusting the channel unoccupancy period using the indirect channel interference information measured from the short unoccupancy period and the long unoccupancy period. In Table 1, $N_s(n)$ denotes the number of short occupancy periods in an n-th interval, and $N_s(n+1)$ denotes the number of short occupancy periods in an (n+1)-th interval. Referring to Table 1, when a signal is detected in the short unoccupancy period, the number of short unoccupancy periods in a next interval increases by one. By contrast, when a signal is detected in the long unoccupancy period, the number of the short unoccupancy periods in the next interval decreases by one. Also, when no signal is detected, the number of the short unoccupancy periods in the next interval does not change.

Referring to FIG. 18, the first system 301 constructs an n-th interval 1801 by combining one short unoccupancy period and one long unoccupancy period. That is, in the n-th interval, the ratio of the long unoccupancy period and the short unoccupancy period is 1:1. A signal of the other system is detected in the short unoccupancy period of the n-th interval 1801, and accordingly the number of short unoccupancy periods in an (n+1)-th interval 1803 increases. Next, a signal of the other system is detected in the long unoccupancy period of the (n+1)-th interval 1803, and accordingly the number of short unoccupancy periods in an (n+2)-th interval 1805 decreases.

For example, provided that the first system 301 is an LTE-U system and the second system 302 is a Wi-Fi system, the example of FIG. 18 can be described as follows. When the LTE-U system and the Wi-Fi system share one channel and channel interference between the two systems are considerable, since a back-off window of the Wi-Fi system operates as exponential back-off and is relatively greater than a back-off window of the LTE-U system in size, fair channel occupancy does not take place and an eNB of the LTE-U system increases the ratio of the long unoccupancy period so as to realize the fair channel occupancy with the Wi-Fi system. By contrast, with less channel interference, the exponential back-off operation of the Wi-Fi system does not occur and the size of the back-off window of the Wi-Fi system stays at a similar level to the LTE-U system. Thus, the eNB of the LTE-U system can predict that the channel sharing with the Wi-Fi system is conducted fairly, increase the ratio of the short unoccupancy period, reduce the channel unoccupancy period, and thus increase the ratio of the occupancy period.

In the embodiment explained with FIG. 18, the unoccupancy periods are classified to the two types of the short unoccupancy period and the long unoccupancy period. However, according to another embodiment of the present disclosure, the unoccupancy periods can be divided into three or more types. In this case, the three or more types can be defined to indicate unoccupancy periods of different lengths. For example, the unoccupancy periods can be classified into the unoccupancy period of a first length, the unoccupancy period of a second length, the unoccupancy period of a third length, and so on.

Figure 19:
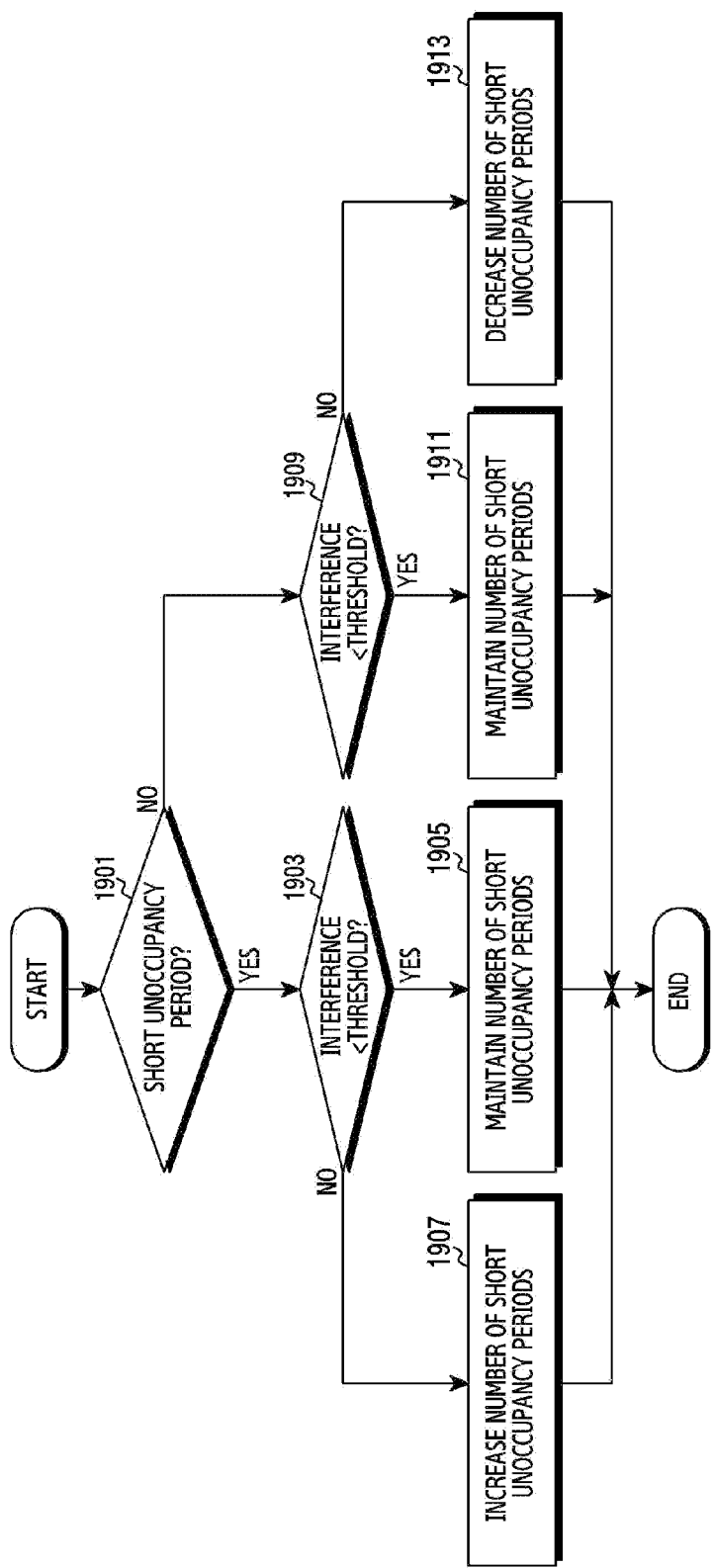
FIG. 19 illustrates a process for adjusting an unoccupancy period according to channel occupancy of other system in a wireless communication system according to an embodiment of the present disclosure.

FIG. 19 illustrates a process for adjusting an unoccupancy period according to channel occupancy of other system in a wireless communication system according to an embodiment of the present disclosure. FIG. 19 illustrates an operating method of the eNB 110 for adjusting the unoccupancy period of FIG. 18.

Referring to FIG. 19, the eNB determines a short unoccupancy period in operation 1901. The eNB defines at least one short unoccupancy period and one long unoccupancy period as one interval, and attempts to detect a signal of other system in the at least one short unoccupancy period and the one long unoccupancy period. In so doing, the eNB determines whether a current unoccupancy period is a short unoccupancy period or a long unoccupancy period.

For the short unoccupancy period, the eNB determines whether interference exceeds a threshold in operation 1903. The interference can be determined through ED on the second system 302. The interference can include a sum or an average of signal strengths of the second system 302. Herein, the interference exceeding the threshold implies that the second system 302 occupies the channel. In other words, the eNB determines whether a signal of the second system 302 is detected in the short unoccupancy period.

When detecting the signal of the second system 302 in the short unoccupancy period, the eNB makes the number of short unoccupancy periods of a next interval greater than the number of the short unoccupancy periods of the current interval. For example, the number of the short unoccupancy periods of the next interval can be greater than the number of the short unoccupancy periods of the current interval by one. By contrast, when not detecting the signal of the second system 302 in the short unoccupancy period, the eNB makes the number of the short unoccupancy periods of the next interval the same as the number of the short unoccupancy periods of the current interval. That is, the number of the unoccupancy periods is maintained.

In operation 1901, for non short unoccupancy period, that is, in the long unoccupancy period, the eNB determines whether the interference exceeds the threshold in operation 1909. The interference can be determined through the ED on the second system 302. The interference can include the sum or the average of the signal strengths of the second system 302. Herein, the interference exceeding the threshold implies that the second system 302 occupies the channel. In other words, the eNB determines whether a signal of the second system 302 is detected in the long unoccupancy period.

When detecting no signal of the second system 302 in the short unoccupancy period, the eNB makes the number of the short unoccupancy periods of the next interval equal the number of the short unoccupancy periods of the current interval in operation 1911. That is, the number of the unoccupancy periods is maintained. By contrast, when detecting the signal of the second system 302 in the long unoccupancy period, the eNB makes the number of the short unoccupancy periods of the next interval less than the number of the short unoccupancy periods of the current interval in operation 1913. For example, the number of the short unoccupancy periods of the next interval can be smaller than the number of the short unoccupancy periods of the current interval by one.

Figure 20:
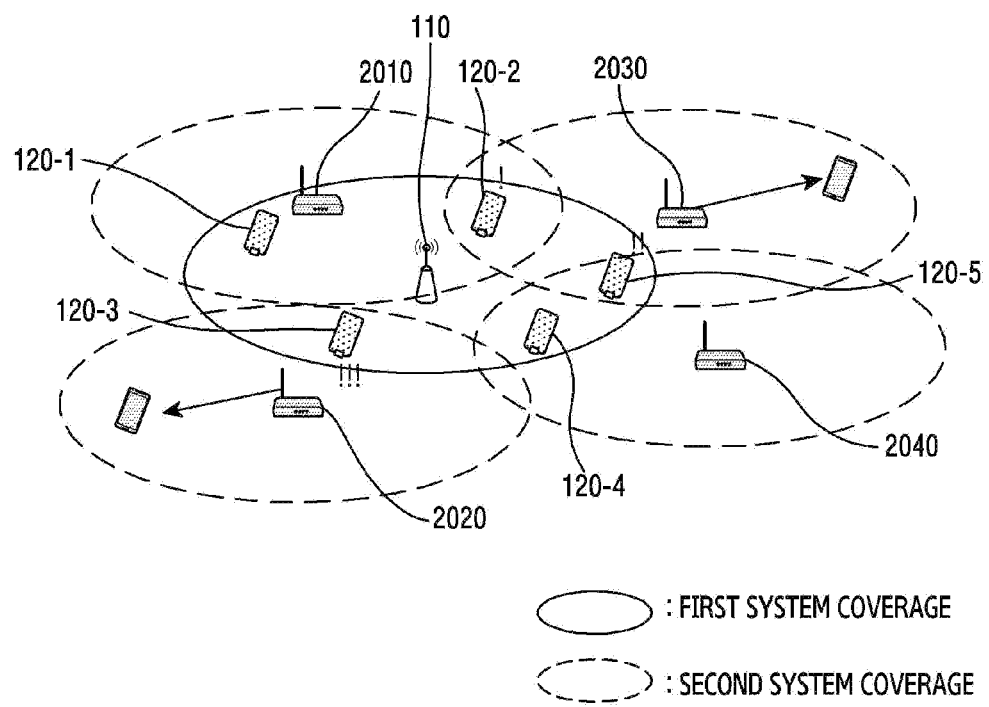
FIG. 20 illustrates an environment including hidden nodes in a wireless communication system according to an embodiment of the present disclosure.

FIG. 20 illustrates an environment including hidden nodes in a wireless communication system according to an embodiment of the present disclosure. FIG. 20 illustrates a cell of the eNB 110 belonging to the first system 301 and cells of nodes 2010, 2020, 2030, and 2040 belonging to the second system 302.

Referring to FIG. 20, a UE 120-1, a UE 120-2, a UE 120-3, a UE 120-4, and a UE 120-5 reside in coverage of the eNB 110. Concurrently, the UE 120-1 also resides in coverage of the node 2010, the UE 120-2 also resides in coverage of the node 2010 and the node 2030, the UE 120-3 also resides in coverage of the node 2020, the UE 120-4 also resides in coverage of the node 2040, and the UE 120-5 also resides in the coverage of the node 2030 and the node 2040. Hence, the UE 120-1 can detect a signal of the node 2010, the UE 120-2 can detect signals of the node 2010 and the node 2030, the UE 120-3 can detect a signal of the node 2020, the UE 120-4 can detect a signal of the node 2040, and the UE 120-5 can detect signals of the node 2030 and the node 2040. However, the eNB 110, which is located outside the coverage of the nodes 2020, 2030, and 2040, cannot detect signals of the nodes 2020, 2030, and 2040. That is, the nodes 2020, 2030, and 2040 serve as hidden nodes to the eNB 110. That is, the hidden node indicates other node which interferes with a UE connected to a corresponding eNB but is not directly recognized by the corresponding eNB.

The nodes 2020, 2030, and 2040 can interfere with the UEs 120-1 through 120-5, and concurrently the UEs 120-1 through 120-5 can also interfere with the nodes 2020, 2030, and 2040. Hence, when the eNB 110 communicates with the UEs 120-1 through 120-5 in the occupancy period, the nodes 2020, 2030, and 2040 can suffer from the interference. Thus, when adjusting the occupancy period or the unoccupancy period of the first system 301, it is advantageous to consider operating states of the nodes 2020, 2030, and 2040. However, the eNB 110 can not directly recognize the nodes 2020, 2030, and 2040. Accordingly, the eNB 110 can estimate the states of the nodes 2020, 2030, and 2040 based on channel quality information fed back from the UEs 120-1 through 120-5.

Specifically, the eNB 110 receives channel quality information of an unlicensed band from the UEs 120-1 through 120-5 in the occupancy period. That is, the eNB 110 receives information indicating channel interference from the UEs 120-1 through 120-5 which use the unlicensed band. In so doing, the UEs 120-1 through 120-5 can transmit the channel quality information of the unlicensed band over a licensed band. The channel quality information indicates a ratio of other interference and noise signal to the signal of the eNB 110, and can include a Signal to Noise and Interference Ratio (SINR), a Carrier to Noise and Interference Ratio (CINR), and the like. Based on the channel quality information, the eNB 110 can estimate a relative co-channel interference level for the nodes 2020, 2030, and 2040 of the second system 302. Thus, the eNB 110 can adaptively control the size of the unoccupancy period based on the channel interference information measured by the UEs 120-1 through 120-5.

When the interference level obtained from the channel quality information is great, this indicates high interference in the channel. By contrast, when the interference level is low, this indicates low interference in the channel. That is, the length of the unoccupancy period can be defined with a function of the interference level. For example, hence, for higher interference, the length of the unoccupancy period can increase. Specifically, the unoccupancy period length can be adjusted based on Equation 7. Equation 7 shows a case where the SINR is used as the channel quality information.

$$T_2(n+1) = T_{CCA} \times \left[ \beta \times \sum_{i \in S} \frac{1}{SINR_i} \right] \quad \text{Equation 7}$$

In Equation 7, $T_2(n+1)$ denotes a length of a next unoccupancy period, $T_{CCA}$ denotes a length of one CCA slot, SINR denotes the channel quality, i denotes an index of the UE, and $\beta$ denotes a weight.

Figure 21:
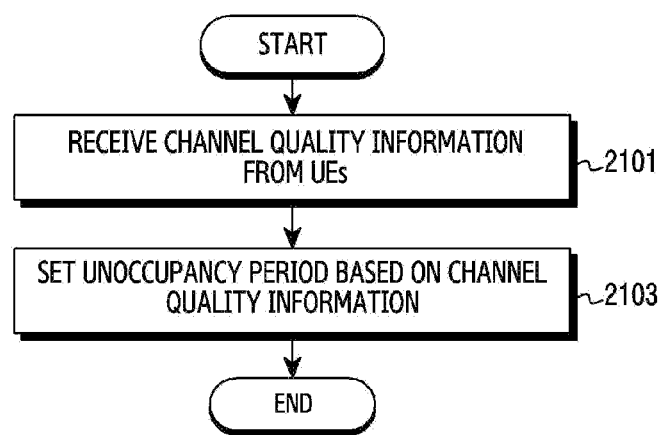
FIG. 21 illustrates a process for adjusting an unoccupancy period based on channel quality information in a wireless communication system according to an embodiment of the present disclosure.

FIG. 21 illustrates a process for adjusting an unoccupancy period based on channel quality information in a wireless communication system according to an embodiment of the present disclosure. FIG. 21 illustrates an operating method of the eNB 110 for adjusting the unoccupancy period of FIG. 20.

Referring to FIG. 21, the eNB receives channel quality information from one or more UEs in operation 2101. The channel quality information is channel quality information about a band shared with the other system. The eNB can determine an interference level of the band based on the channel quality information.

Next, the eNB sets an unoccupancy period based on the channel quality information in operation 2103. In other words, the eNB determines a length of the unoccupancy period based on the interference level of the band. For example, for higher interference, the eNB can set a greater length of the unoccupancy period. Specifically, the length of the unoccupancy period can be adjusted based on Equation 7.

Figure 22:
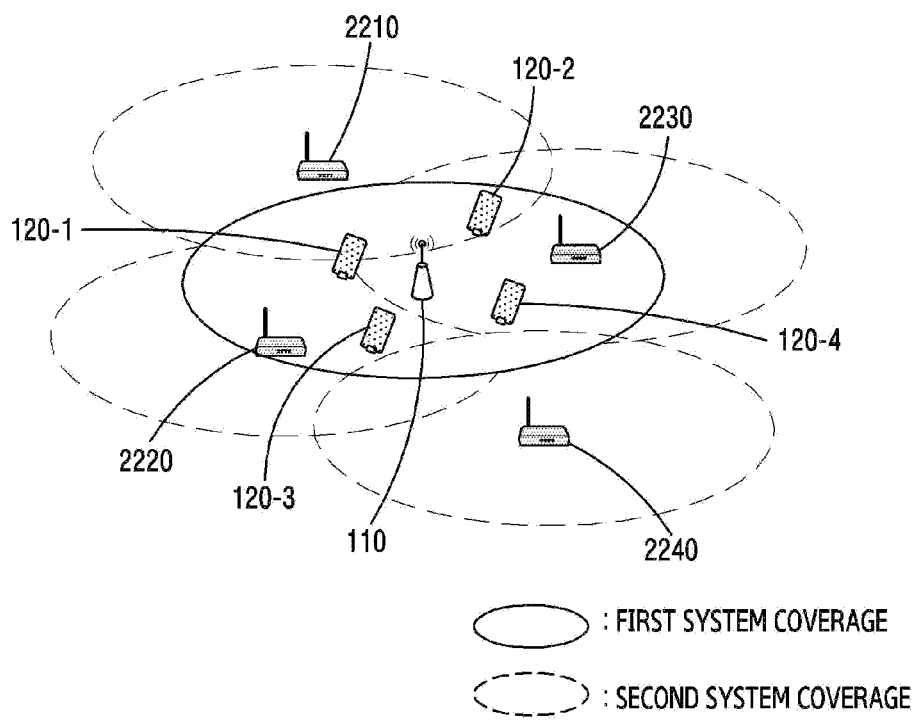
FIG. 22 illustrates an environment including hidden nodes in a wireless communication system according to an embodiment of the present disclosure.

FIG. 22 illustrates an environment including hidden nodes in a wireless communication system according to an embodiment of the present disclosure. FIG. 22 illustrates a cell of the eNB 110 belonging to the first system 301 and cells of nodes 2210, 2220, 2230, and 2240 belonging to the second system 302.

Referring to FIG. 22, a UE 120-1, a UE 120-2, a UE 120-3, and a UE 120-4 reside in coverage of the eNB 110. Concurrently, the UE 120-1 also resides in coverage of the node A 2210, the UE 120-2 also resides in coverage of the node A 2210 and the node C 2230, the UE 120-3 also resides in coverage of the node B 2220, and the UE 120-4 also resides in coverage of the node C 2230. Hence, the UE 120-1 can detect a signal of the node A 2220, the UE 120-2 can detect signals of the node A 2210 and the node C 2240, the UE 120-3 can detect a signal of the node B 2220, the UE 120-4 can detect a signal of the node D 2240, and the UE 120-5 can detect signals of the node C 2230 and the node D 2240. However, the eNB 110, which is located outside the coverage of the nodes 2210 and 2240, cannot detect signals of the nodes 2210 and 2240. That is, the nodes 2210 and 2240 serve as hidden nodes to the eNB 110. That is, the hidden node indicates other node which interferes with a UE connected to a corresponding eNB but is not directly recognized by the corresponding eNB.

In the case of FIG. 22, the eNB 110 tries to detect a preamble of at least one node of the second system 302. Also, the UEs 120-1 through 120-4 can detect a preamble of at least one node of the second system 302. Hence, the eNB 110 and the UEs 120-1 through 120-4 each can identify the preamble received and which node sends the preamble. Accordingly, information of Table 2 can be generated based on preambles successfully detected.

TABLE 2

|  | UE measurement | eNB measurement |
|---|---|---|
| node A | ○ | X |
| node B | ○ | ○ |
| node C | ○ | ○ |
| node D | ○ | X |

In Table 2, ○ denotes the success of the preamble detection. A node which sends the preamble detected by all of at least one of the UEs 120-1 through 120-4 and the eNB 110 can be determined as a non-hidden node. By contrast, a node (e.g., the node A 2210, the node D 2230) which sends the preamble detected by only at least one of the UEs 120-1 through 120-4 can be determined as the hidden node. Since an eNB or a node is not frequently installed anew or moved, the information of Table 2 can be used relatively for a long time duration.

When identifying the hidden node as stated above, when one of nodes of the second system 302 is in downlink transmission, at least one of the UEs 120-1 through 120-4 can identify the node of the downlink transmission in the unoccupancy period of the first system 301 using the hidden node information obtained based on the information of Table 2, and report to the eNB 110. When a set of the hidden nodes is A and a set of nodes which are not hidden nodes is B, the eNB 110 can determine how many nodes of the current set A and set B transmit the downlink based on information reported from at least one of the UEs 120-1 through 120-4. For example, states of the nodes can be determined as shown in Table 3.

TABLE 3

|        | set | state |
|--------|-----|-------|
| node A | A   | ○     |
| node B | B   | X     |
| node C | B   | ○     |
| node D | A   | ○     |

When many nodes are transmitting in the set B, high traffic load of a current channel can be predicted. By contrast, when a small number of nodes are transmitting in the set B, low traffic load of the current channel can be predicted. When many nodes of the set A is transmitting and the eNB 110 commences downlink transmission, it is expected that there can be a node of the second system 302, which regards the eNB 110 as the hidden node. This allows the nodes of the second system 302 which suffer from the hidden node problem due to the eNB 110 to perform the exponential back-off, and as a result, can increase the time taken to process the traffic in the whole system and raise the load level of the channel.

Hence, according to an embodiment of the present disclosure, based on activity states of the nodes of the second system 302 determined as the hidden nodes and other nodes, the eNB 110 can adaptively adjust the occupancy period of the first system 302. In other words, the eNB 110 can adaptively adjust the length of the occupancy period using information about the set B which directly affects the channel traffic load and information about the set A which indirectly affects the channel traffic load. When the set B includes many nodes currently transmitting, the traffic load level of the current channel can be determined in proportion to the number of the nodes. Hence, the eNB 110 determines the length of the occupancy period based on the number of the nodes currently transmitting in the set B. In so doing, the length of the occupancy period can be proportional to the number of the nodes currently transmitting in the set B. Meanwhile, since the activity of the eNB 110 can indirectly affect the node currently transmitting in the set A in terms of the channel traffic load, the eNB 110 can determine the length of the occupancy period based on the number of the nodes currently transmitting in the set A. For example, the length of the occupancy period can be determined based on Equation 8.

$$T_1(n+1) = \left\lceil \frac{T_{COT_{max}}}{n_2+1} \right\rceil - g(n_3) \qquad \text{Equation 8}$$

$$\text{where } g(x) = \begin{cases} 1, & x \geq 1 \\ 0, & x = 0 \end{cases}$$

In Equation 8, $T_1(n+1)$ denotes a length of a next occupancy period, $T_{COT_{max}}$ denotes a maximum length of the occupancy period, $n_2$ denotes the number of transmitting nodes among nodes which are not hidden nodes, and $n_3$ denotes the number of transmitting nodes among the hidden nodes.

According to Equation 8, the length of the occupancy period reduces as the number of non-hidden nodes, that is, the number of the transmitting nodes of the set B increases. The activity of the nodes of the set A merely decreases the length of the occupancy period to a fixed amount, and the decrease does no change according to the number of the transmitting nodes. This is because the hidden nodes do not directly exert influence. According to Equation 8, in Table 3, the length of the next occupancy period is $$T_1(n+1) = \left\lceil \frac{T_{COT_{max}}}{2} \right\rceil - 1 = 6 \text{ ms}.$$

As described above, the length of the occupancy period can be adjusted based on the type (e.g., whether it is the hidden node or not) and the activity state of the nodes of the second system 302. Concurrently, the length of the unoccupancy period can be adjusted. In so doing, the length of the unoccupancy period can be adjusted according to the embodiment explained by referring to FIG. 18. In this case, the number of the nodes of the second system 302 entering the unoccupancy period channel can be obtained through preamble detection. Thus, the eNB 110 can obtain the number of nodes entering the short unoccupancy period and the number of nodes entering in the long unoccupancy period among at least one transmitting node of the set B, and adjust the ratio of the short unoccupancy period and the long unoccupancy period based on the ratio of the numbers. For example, in Table 3, since $n_2=1$ and $n_3=2$, $N_s(n+1)=N_s(n)-1$ can be set.

Figure 23:
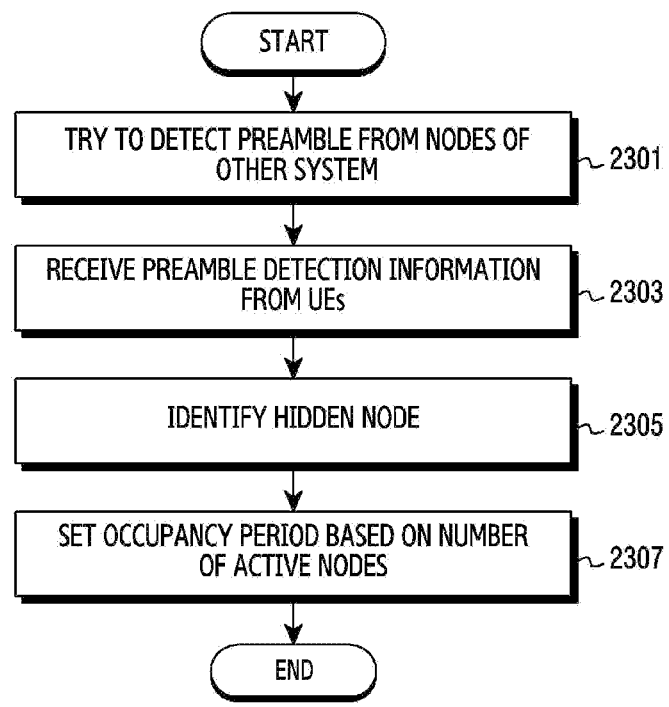
FIG. 23 illustrates a process for adjusting an occupancy period based on the number of active nodes of other system in a wireless communication system according to an embodiment of the present disclosure.

FIG. 23 illustrates a process for adjusting an occupancy period according to the number of active nodes of other system in a wireless communication system according to an embodiment of the present disclosure. FIG. 23 illustrates an operating method of the eNB 110 for adjusting the occupancy period as shown in FIG. 22.

Referring to FIG. 23, the eNB tries to detect a preamble from at least one node of other system (e.g., the second system 302) in operation 2301. The preamble includes identification information of a corresponding node, and the eNB 110 can obtain presence and identification information of the at least one node from the preamble. In so doing, the preamble of at least one node may be detected, or no preambles may be detected.

Next, the eNB receives information indicating a preamble detection result of the second system 302 from at least one UE in operation 2303. The information includes identification information of at least one node which sends the preamble of the node of the second system 302 detected by the at least one UE. In so doing, the information can include identification information of at least one node, or a value indicating that no preambles are detected.

Next, the eNB identifies a hidden node in operation 2305. In other words, the eNB determines whether the hidden node exists and the number of hidden nodes. Specifically, the eNB, which does not directly detect, determines the node which sends the reported preamble detected by the UE, as the hidden node. Accordingly, an identification result of Table 2 can be attained.

Next, the eNB adjusts a size of the occupancy period based on the number of active nodes in operation 2307. In so doing, the number of the active nodes is divided to and used as hidden nodes and non-hidden nodes. That is, the eNB adjusts the size of the occupancy period based on the number of active nodes, that is, the number of transmitting hidden nodes and the number of transmitting non-hidden nodes. Specifically, the eNB can shorten the length of the occupancy period as the number of the active non-hidden nodes is great. Also, when at least one hidden-node is active, the eNB can reduce the length of the occupancy period by a fixed size. For example, the eNB can determine the length of the occupancy period based on Equation 8.

Figure 24:
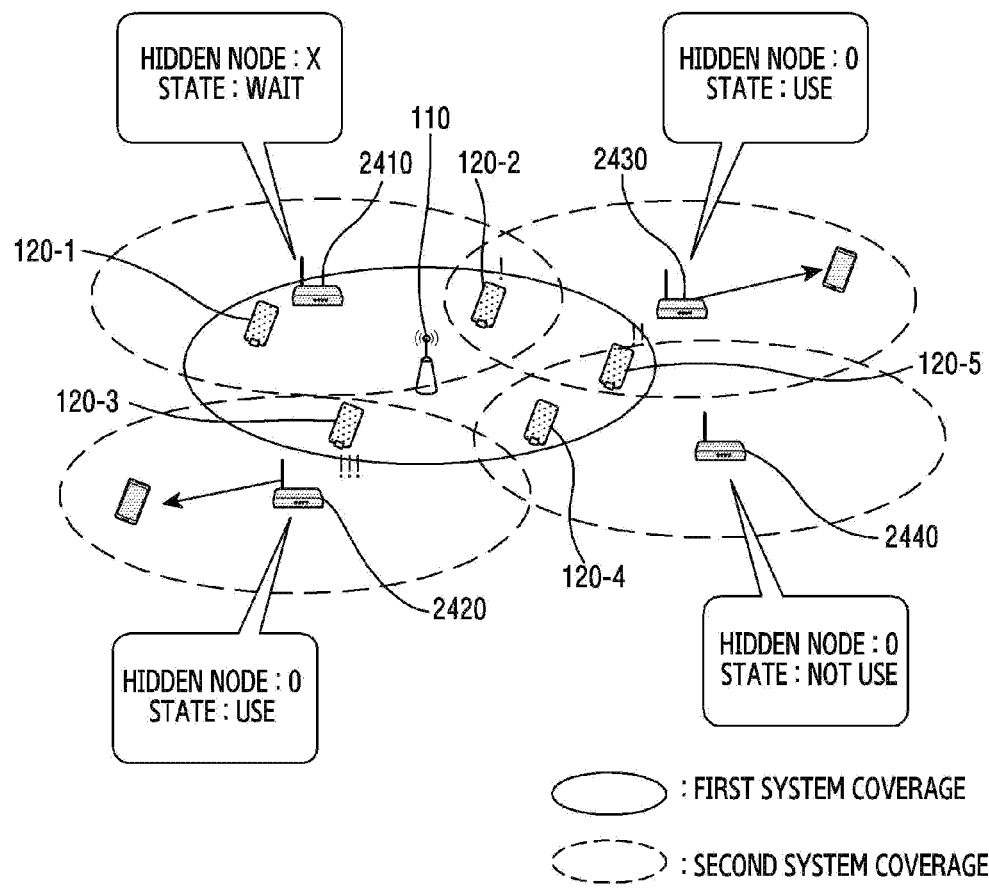
FIG. 24 illustrates an environment including hidden nodes in a wireless communication system according to an embodiment of the present disclosure.

FIG. 24 illustrates an environment including hidden nodes in a wireless communication system according to an embodiment of the present disclosure. FIG. 24 illustrates a cell of the eNB 110 belonging to the first system 301 and cells of nodes 2410, 2420, 2430, and 2440 belonging to the second system 302.

Referring to FIG. 24, a UE 120-1, a UE 120-2, a UE 120-3, a UE 120-4, and a UE 120-5 reside in coverage of the eNB 110. Concurrently, the UE 120-1 also resides in coverage of the node A 2410, the UE 120-2 also resides in coverage of the node A 2410 and the node C 2430, the UE 120-3 also resides in coverage of the node B 2420, the UE 120-4 also resides in coverage of the node D 2440, and the UE 120-5 also resides in coverage of the node C 2430 and the node D 2440. Hence, the UE 120-1 can detect a signal of the node A 2410, the UE 120-2 can detect signals of the node A 2410 and the node C 2430, the UE 120-3 can detect a signal of the node B 2420, the UE 120-4 can detect a signal of the node D 2440, and the UE 120-5 can detect signals of the node C 2430 and the node D 2440. However, the eNB 110, which is located outside the coverage of the nodes 2420, 2430, and 2440, cannot detect signals of the nodes 2420, 2430, and 2440. That is, the nodes 2420, 2430, and 2440 serve as hidden nodes to the eNB 110. That is, the hidden node indicates other node which interferes with a UE connected to a corresponding eNB but is not directly recognized by the corresponding eNB.

In the case of FIG. 24, the eNB 110 tries to detect a preamble of at least one node of the second system 302. At this time, the eNB 110, which is located in the coverage of the node 2410, can detect a preamble of the node 2410. Since the preamble includes identification information of a corresponding node, the eNB 110 can identify the node 2410. Further, the UEs 120-1 through 120-5 can also try to detect a preamble of at least one node of the second system 302. The UEs 120-1 through 120-5 send a detection result of the preamble to the eNB 110. Hence, the eNB 110 can identify the hidden node using its direct preamble measurement result and the preamble measurement results received from the UEs 120-1 through 120-5. That is, when the UEs 120-1 through 120-5 can decode and distinguish the preamble of the second system 302, the eNB 110 can identify hidden nodes based a list decoded and reported by the UE. For example, the preamble measurement results of Table 4 can be organized.

TABLE 4

|  | UE measurement | eNB measurement |
| --- | --- | --- |
| Node A | ○ | ○ |
| Node B | ○ | X |
| Node C | ○ | X |
| Node D | ○ | X |

Referring to Table 4, the preamble of the node A 2410 is detected by one of UEs, and also by the eNB 110, and accordingly the node A 2410 is not the hidden node. By contrast, since the preambles of the other nodes 2420, 2430, and 2440 are detected by one of the UEs but not by the eNB 110, the other nodes 2420, 2430, and 2440 are hidden nodes.

As the hidden nodes are identified, the eNB 110 can adjust the length of the unoccupancy period based on the number of the hidden nodes. For example, for more hidden nodes, the eNB 110 can increase the length of the unoccupancy period. According to another embodiment of the present disclosure, when obtaining states of the hidden nodes, the eNB 110 can consider not only the number of the hidden nodes but also the states of the hidden nodes.

When the preamble detection result from the UE includes a particular node at a certain time point and the eNB 110 cannot detect the preamble of the node, the node is the hidden node. However, when the preamble detection result received later from the UE does not include the node, the node is in communication. That is, the node is the hidden node but temporarily suspends the communication. Accordingly, after the identification result of the hidden node is determined as shown in Table 3, the states of the hidden nodes can be determined as shown in Table 5 based on reports from additional UEs.

TABLE 5

|  | state |
| --- | --- |
| node A | X |
| node B | ○ |
| node C | ○ |
| node D | X |

Referring to Table 5, the node A 2410 and the node D 2440 suspend the communication, and the node B 2420 and the node C 2430 are communicating. Hence, the eNB 110 can determine the length of the unoccupancy period based on the number of the communicating hidden nodes among the hidden nodes. For example, the length of the unoccupancy period can be adjusted based on Equation 9.

$$T_2(n+1) = T_{CCA}[\gamma N_{Hidden}]$$  Equation 9

In Equation 9, $T_2(n+1)$ denotes a length of a next unoccupancy period, $T_{CCA}$ denotes a length of one CCA slot, $\gamma$ denotes a weight, and $N_{Hidden}$ denotes the number of the communicating hidden nodes.

Figure 25:
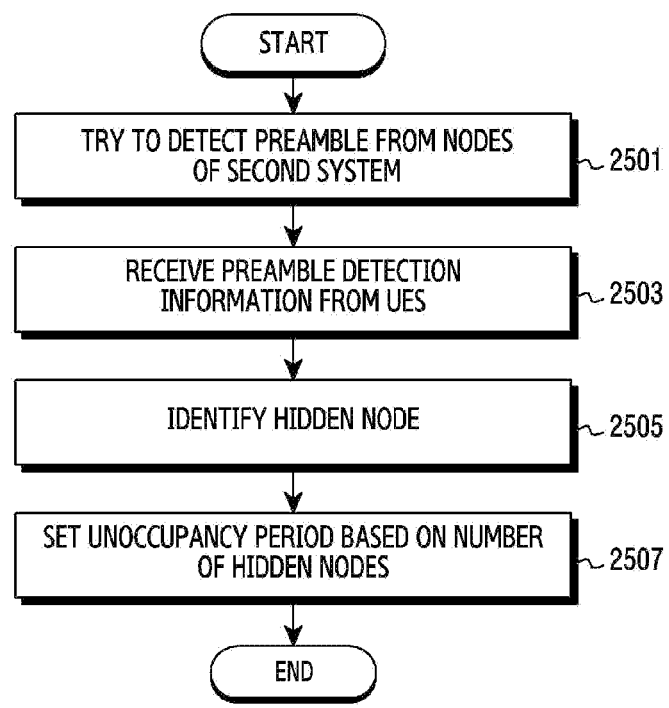
FIG. 25 illustrates a process for adjusting an unoccupancy period based on a hidden node situation in a wireless communication system according to an embodiment of the present disclosure.

FIG. 25 illustrates a process for adjusting an unoccupancy period according to the number of hidden nodes in a wireless communication system according to an embodiment of the present disclosure. FIG. 25 illustrates an operating method of the eNB 110 for adjusting the unoccupancy period as shown in FIG. 24.

Referring to FIG. 25, the eNB tries to detect a preamble from at least one node of the second system 302 in operation

2501. The preamble includes identification information of a corresponding node, and the eNB 110 can obtain presence and the identification information of the at least one node from the preamble. In so doing, the preamble of at least one node may be detected, or no preambles can be detected.

Next, the eNB receives information indicating a preamble detection result of the second system 302 from at least one UE in operation 2503. The information includes identification information of at least one node which sends the preamble of the node of the second system 302 detected by the at least one UE. In so doing, the information can include identification information of at least one node, or a value indicating that no preambles are detected.

Next, the eNB identifies a hidden node in operation 2505. In other words, the eNB determine whether the hidden node exists and the number of hidden nodes. Specifically, the eNB determines a node which is not directly detected but sends the reported preamble detected by the UE, as the hidden node. Accordingly, identification results of Table 3 can be acquired.

Next, the eNB adjusts a size of the unoccupancy period based on the number of the hidden nodes in operation 2507. Specifically, the eNB can increase the length of the unoccupancy period as the number of the hidden nodes is great. According to another embodiment of the present disclosure, the eNB 110 can adjust the length of the unoccupancy period based on the number of communicating hidden nodes among the hidden nodes. For example, the eNB can determine the length of the unoccupancy period based on Equation 7.

As described above, various embodiments for the band sharing can be applied to diverse cell environments. For example, various embodiments of the present disclosure can be applied to a cell environment of FIG. 26.

Figure 26:
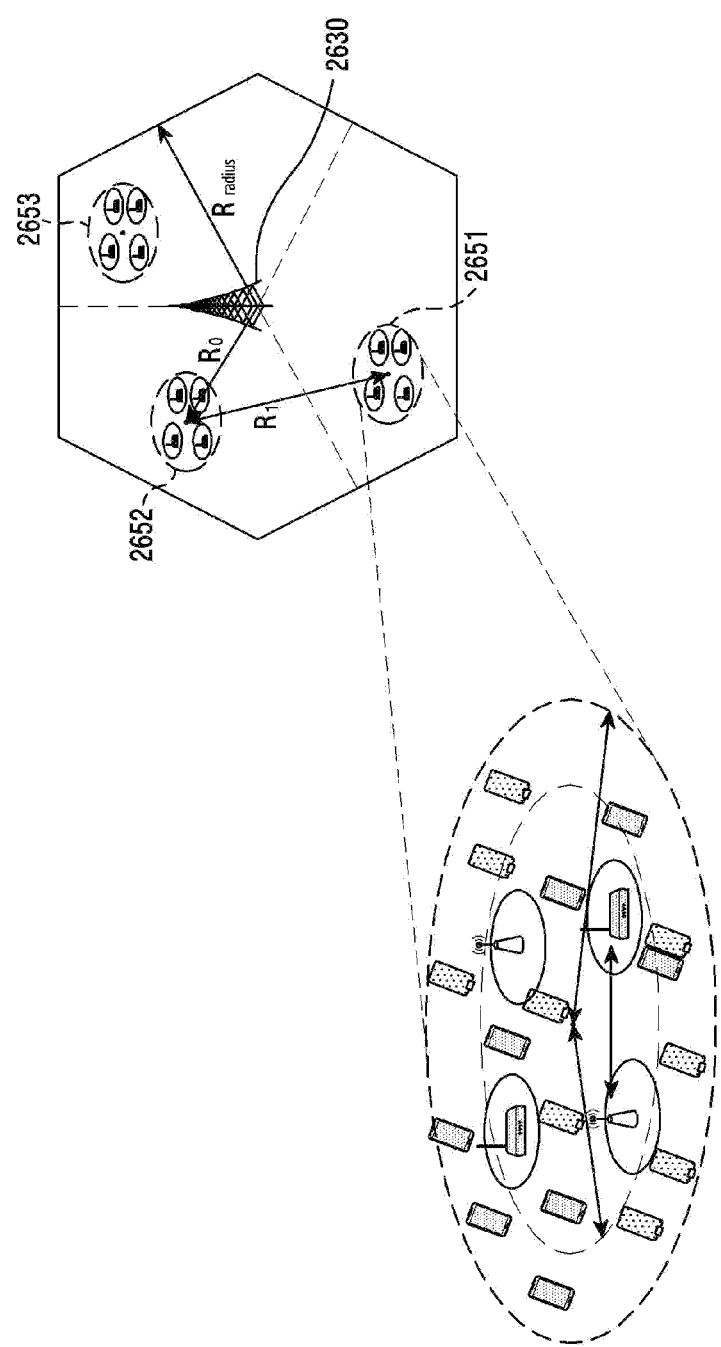
FIG. 26 illustrates an example of a cell environment of a wireless communication system according to an embodiment of the present disclosure.

FIG. 26 illustrates an example of a cell environment of a wireless communication system according to an embodiment of the present disclosure. Referring to FIG. 26, a plurality of clusters 2651 through 2653 is formed in a cell of a macro eNB 2630. The clusters 2651 through 2653 each can include an eNB of at least one first system 301 and a node of at least one second system 302. That is, eNBs of the first system and eNBs of the second system build one cluster, and a plurality of clusters can be deployed in coverage of the macro eNB 2630. Herein, the first system 301 can include an LTE system using Licensed-Assisted Access (LAA), LTE-U, and a synchronous radio access system, and the second system 302 can include Wi-Fi and an asynchronous radio access system.

FIGS. 27, 28, 29, and 30 depict simulation results of a wireless communication system according to an embodiment of the present disclosure. The simulations are conducted in the environment of FIG. 26. Parameters used in the simulations are set as shown in Table 6.

TABLE 6

| Parameter | First system | Second system |
|---|---|---|
| Macro cell number | 1 cells × 3 sectors | |
| System bandwidth per carrier | 20 MHz | |
| Carrier frequency | 5.0 GHz for unlicensed band | |
| Carrier number | 1 | |
| Number of clusters per Macro area | 1 | |
| Number of cells per operator per cluster | 2 | |
| Cell selection | UEs/Nodes select the serving cell based on RSRP within single operator | |
| Pico/AP antenna configuration | 2D, Omni-directional, 1Tx2Rx DL in cross-polarized | |
| Cell antenna height | 10 m | |
| Pico and AP Tx power | 18 dBm | |
| SC antenna gain excluding feeder loss | 5 dBi | |
| Number of UEs | 5 per small cell | |
| UE receiver | MRC | |
| UE antenna height | 1.5 m | |
| UE/Sta transmission power | 23 dBm | |
| UE antenna gain excluding feeder loss | 0 dBi | |
| Scheduler algorithm | PF | CSMA/CA-based |
| HARQ | Retransmission with maximum 3 times | NA |
| Traffic model | FTP3 with packet size of 0.5 Mbyts, Arrival rate 0.5 | |
| Metric | UPT, latency | |

Figure 27:
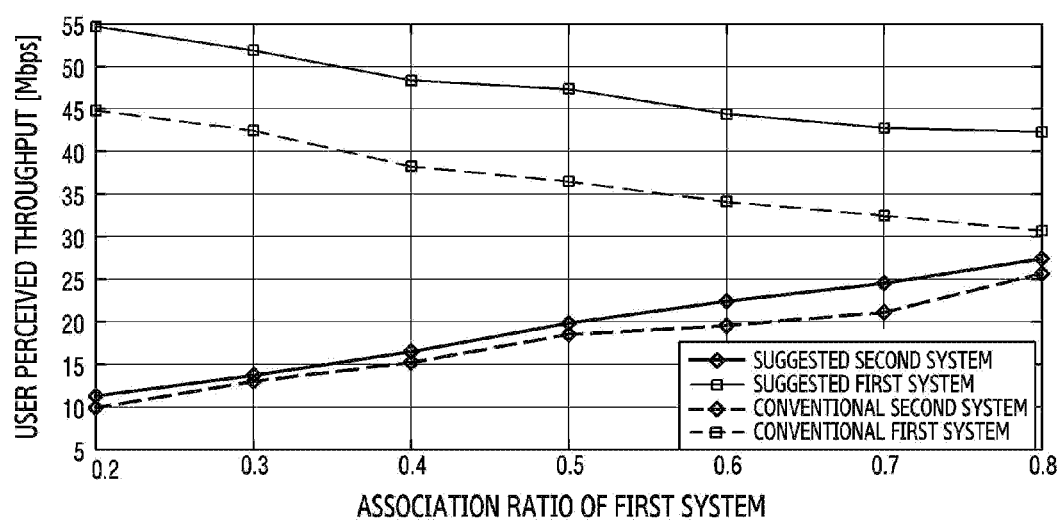
FIGS. 27 through 30 depict simulation results of a wireless communication system according to an embodiment of the present disclosure.

Referring to FIG. 27, a vertical axis indicates a user perceived throughput, and a horizontal axis indicates an association ratio of the first system. The user perceived throughput is defined based on Equation 10.

$$UPT = \frac{S_{Packet}}{T_{Packet_{Reception}} - T_{Packet_{Arrival}}} \quad \text{Equation 10}$$

In Equation 10, UPT denotes the user perceived throughput, $S_{Packet}$ denote a size of a packet, $T_{Packet_{Reception}}$ denotes the time when a packet is successfully received at a UE, and $T_{Packet_{Arrival}}$ denotes the time when the packet arrives at a buffer. That is, the user perceived throughput is the value produced by dividing the packet size by the difference between the time when the packet is successfully received and the time when the packet arrives at the system buffer.

As shown in FIG. 27, according to an embodiment of the present disclosure, the user perceived throughput increases in every range. Also, according to an embodiment of the present disclosure, when the association ratio of the first system increases, the user perceived throughput of the second system is similar to or better than an existing second system. Specifically, when the present disclosure is applied, a gain of about 22% through 38% is attained compared to the related art.

Figure 28:
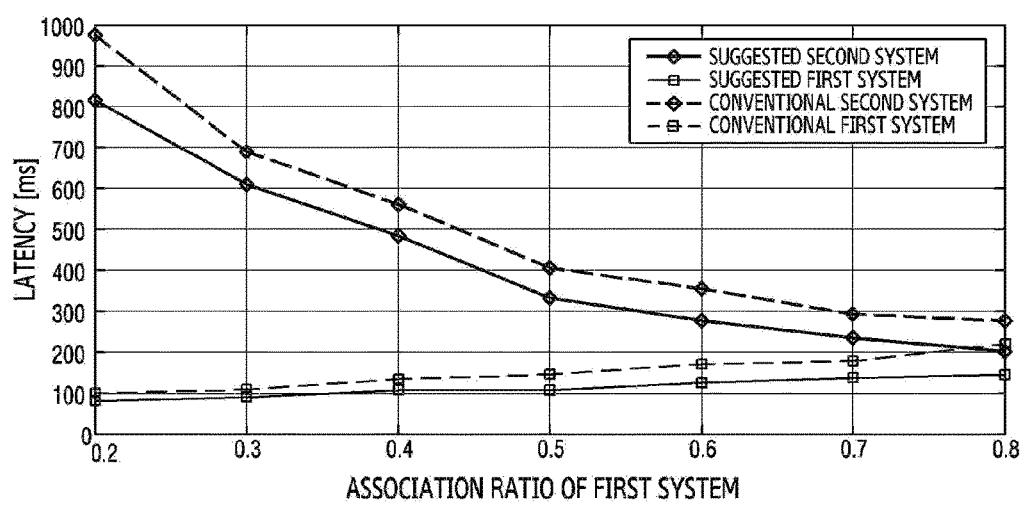

Referring to FIG. 28, the vertical axis is latency, and the horizontal axis is an association ratio of the first system. The latency is defined based on Equation 11.

$$\text{Latency} = T_{Packet_{Reception}} - T_{Packet_{Arrival}} \quad \text{Equation 11}$$

In Equation 11, Latency denotes the latency, $T_{Packet_{Reception}}$ denotes the time when a packet is successfully received at the UE, and $T_{Packet_{Arrival}}$ denotes the time when the packet arrives at the system buffer. That is, the latency is the interval between the time when the packet is successfully received and the time when the packet arrives at the system buffer.

Referring to FIG. 28, according to an embodiment of the present disclosure, the latency reduces in every range. Also, according to an embodiment of the present disclosure, as the association ratio of the first system increases, the latency of both of the first system and the second system declines. Specifically, when the present disclosure is applied, the latency decreases by about 18% through 33% compared to the related art.

Figure 29:
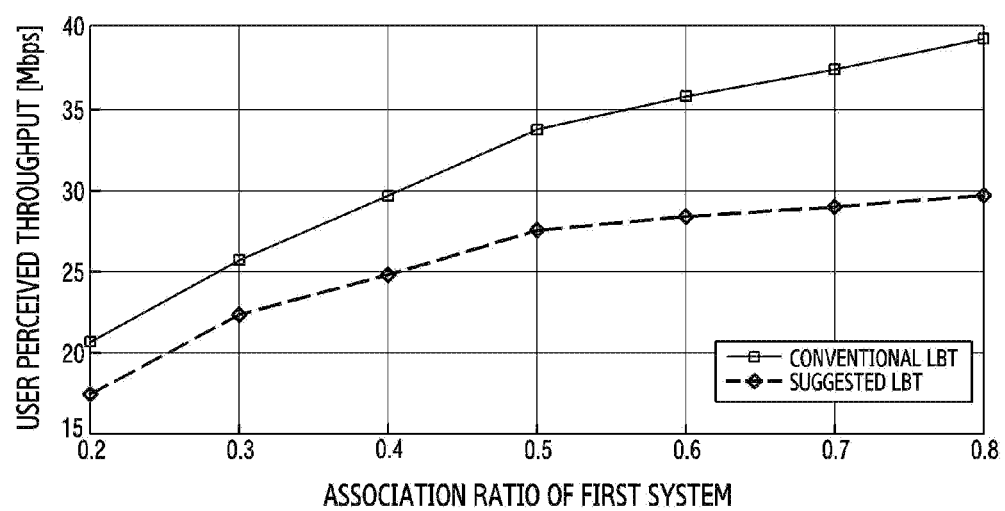

Referring to FIG. 29, the vertical axis indicates an average user perceived throughput, the horizontal axis indicates the association ratio of the first system, and conventional LBT and LBT according to an embodiment of the present disclosure are compared. Referring to FIG. 29, the LBT according to an embodiment of the present disclosure provides a higher average user perceived throughput. Specifically, when the present disclosure is applied, the gain of about 15% through 33% is attained compared to the related art.

Figure 30:
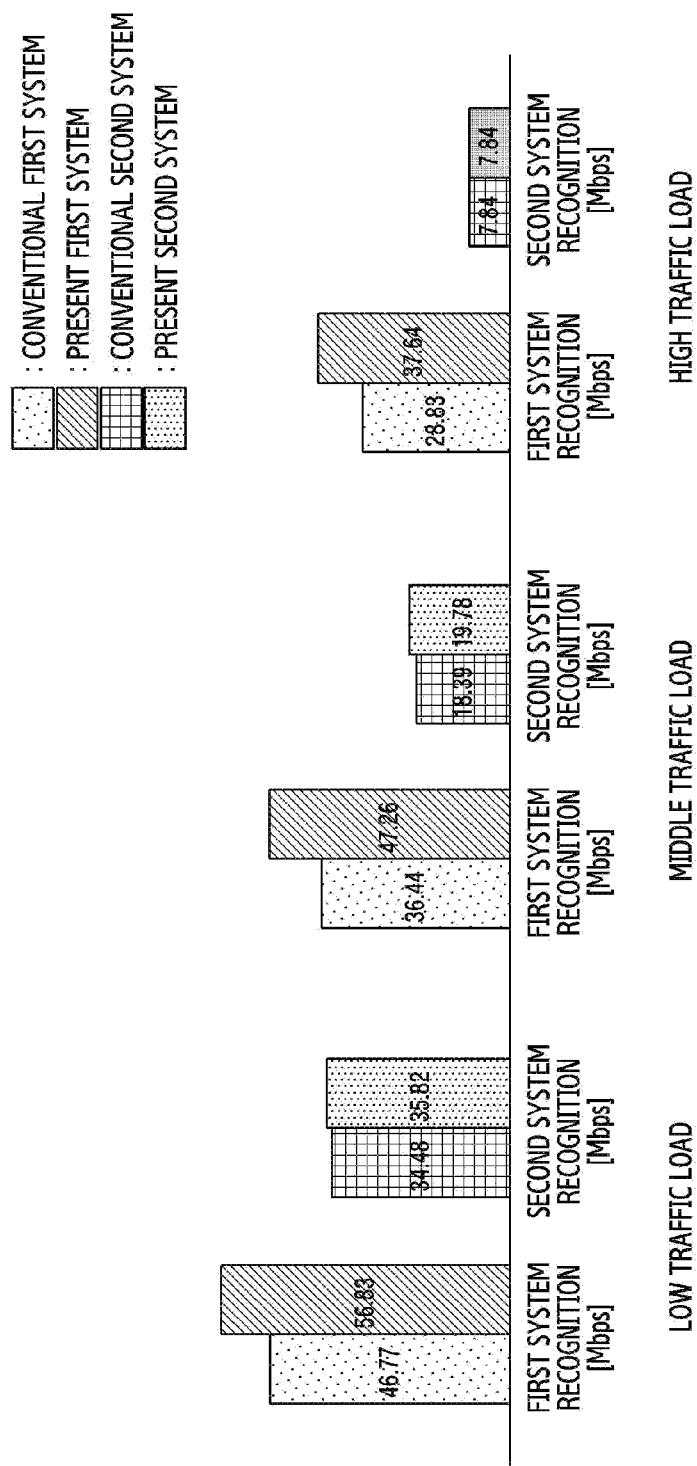

FIG. 30 compares, when the association ratio between the first system and the second system is fixed to 0.5, the conventional user perceived throughput with the user perceived throughput according to an embodiment of the present disclosure base on traffic load. Referring to FIG. 30, as the traffic load is low, the first system and the second system provide a higher user perceived throughput. A difference of the user perceived throughput between the first system of the present disclosure and a conventional first system gets small as the traffic load increases. Also, a difference of the user perceived throughput between the second system of the present disclosure and a conventional second system is not greatly affected by the traffic load. Specifically, according to the present disclosure, performance of the second system is maintained and performance of the first system acquires the gain of about 14% through 22% compared to the related art.

The methods according to embodiments described in the claims or the specification of the present disclosure can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of an electronic device. One or more programs can include instructions for enabling the electronic device to execute the methods according to the embodiments described in the claims or the specification of the present disclosure.

While the specific embodiment has been described in the specification of the present disclosure, it will be understood that various changes can be made therein without departing from the scope of the present. Therefore, the scope of the disclosure is not limited to the described embodiments but is defined by the scope of the claims to be explained and their equivalents.

The invention claimed is:

1. An apparatus of a base station (BS) in a first communication system, comprising:
a transceiver; and
at least one processor operably coupled to the transceiver, and configured to:
transmit a first signal in a first channel occupancy period, over a band shared between the first communication system and a second communication system;
determine a length of a second channel occupancy period based on a result of an energy detection of the band; and
transmit a second signal in the second channel occupancy period, over the band,
wherein, if a number of times that channel occupancy periods comprising the first channel occupancy period are maintained at a minimum length exceeds a threshold, the at least one processor is further configured to increase the length of the second channel occupancy period by a value corresponding to an amount of remaining traffic.

2. The apparatus of claim 1,
wherein the at least one processor is further configured to determine the length of the second channel occupancy period based on a size of a delay, and
wherein the delay comprises at least one contention period between the first channel occupancy period and the second channel occupancy period.

3. The apparatus of claim 2, wherein the at least one processor is further configured to:
determine the length of the second channel occupancy period to be a minimum length of the channel occupancy period, if the size of the delay is greater than a maximum value; and
determine the length of the second channel occupancy period to be a maximum length of the channel occupancy period, if the size of the delay is less than a minimum value.

4. The apparatus of claim 1, wherein the at least one processor is further configured to:
set an interval comprising at least one first type contention period having a first length and at least one second type contention period having a second length; and
if detecting a signal of the second communication system in the at least one first type contention period, increase a number of the at least one first type contention period in a next interval.

5. The apparatus of claim 4, wherein the at least one processor is further configured to:
if detecting a signal of the second communication system in the at least one second type contention period, decrease a number of the at least one first type contention period in a next interval.

6. The apparatus of claim 1, wherein the at least one processor is further configured to determine a length of a contention period based on an interference level determined by channel quality information received from at least one terminal.

7. The apparatus of claim 1, wherein the at least one processor is further configured to:
identify at least one hidden node based on a detection result of the BS and a detection result of at least one terminal, with respect to a preamble received from a node of the second communication system, and
determine the length of the second channel occupancy period or a length of a contention period based on at least one of a number of active hidden nodes or a number of active non-hidden nodes.

8. The apparatus of claim 1, wherein the at least one processor is further configured to:
determine the length of the second channel occupancy period to be longer than a length of the first channel occupancy period, if the result of the energy detection is greater than a threshold value; and
determine the length of the second channel occupancy period to be less than the length of the first channel occupancy period, if the result of the energy detection is smaller than the threshold value.

9. The apparatus of claim 8, wherein an amount of a difference between the length of the first channel occupancy period and the length of the second channel occupancy period is determined based on the length of the first channel occupancy period.

10. A method for operating a base station (BS) in a first communication system, comprising:
transmitting a first signal in a first channel occupancy period, over a band shared between the first communication system and a second communication system;

determining a length of a second channel occupancy period based on a result of an energy detection of the band;

transmitting a second signal in the second channel occupancy period, over the band; and if a number of times that channel occupancy periods comprising the first channel occupancy period are maintained at a minimum length exceeds a threshold, increasing the length of the second channel occupancy period by a value corresponding to an amount of remaining traffic.

11. The method of claim 10, further comprising determining the length of the second channel occupancy period based on a size of a delay, wherein the delay comprises at least one contention period between the first channel occupancy period and the second channel occupancy period.

12. The method of claim 11, further comprising:

determining the length of the second channel occupancy period to be a minimum length of the channel occupancy period, if the size of the delay is greater than a maximum value; and determining the length of the second channel occupancy period to be a maximum length of the channel occupancy period, if the size of the delay is less than a minimum value.

13. The method of claim 10, further comprising:

setting an interval comprising at least one first type contention period having a first length and at least one second type contention period having a second length; and if detecting a signal of the second communication system in the at least one first type contention period, increasing a number of the at least one first type contention period in a next interval.

14. The method of claim 13, further comprising:

if detecting a signal of the second communication system in the at least one second type contention period, decreasing a number of the at least one first type contention period in a next interval.

15. The method of claim 10, further comprising:

determining a length of a contention period based on an interference level determined by channel quality information received from at least one terminal.

16. The method of claim 10, further comprising:

identifying at least one hidden node based on a detection result by the BS and a detection result of at least one terminal with respect to a preamble received from a node of the second communication system; and determining the length of the second channel occupancy period or a length of a contention period based on at least one of a number of active hidden nodes or a number of active non-hidden nodes.

17. The method of claim 10, further comprising:

determining the length of the second channel occupancy period to be longer than a length of the first channel occupancy period, if the result of the energy detection is greater than a threshold value; and determining the length of the second channel occupancy period to be less than the length of the first channel occupancy period, if the result of the energy detection is smaller than the threshold value.

18. The method of claim 17, wherein an amount of a difference between the length of the first channel occupancy period and the length of the second channel occupancy period is determined based on the length of the first channel occupancy period.

\* \* \* \* \*